(12) United States Patent
Weissmueller et al.

(10) Patent No.: US 6,824,194 B2
(45) Date of Patent: Nov. 30, 2004

(54) CONVERTIBLE WITH A ROOF, WHICH CAN BE STOWED IN THE REAR REGION OF THE VEHICLE BELOW A LID

(75) Inventors: Olaf Weissmueller, Bramsche (DE); Udo Heselhaus, Ibbenbueren (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/982,563

(22) Filed: Oct. 18, 2001

(65) Prior Publication Data

US 2002/0093218 A1 Jul. 18, 2002

(30) Foreign Application Priority Data

Oct. 20, 2000 (DE) .......................................... 100 52 001
Oct. 20, 2000 (DE) .......................................... 100 51 996

(51) Int. Cl.[7] ................................................ B60J 7/20
(52) U.S. Cl. ............................ 296/136.05; 296/107.08; 296/76
(58) Field of Search ....................... 296/136.05, 136.09, 296/107.08, 76, 136

(56) References Cited

U.S. PATENT DOCUMENTS

| | | | | |
|---|---|---|---|---|
| 5,823,606 A | * | 10/1998 | Schenk et al. ......... | 296/107.08 |
| 6,010,178 A | * | 1/2000 | Hahn et al. ............. | 296/107.08 |
| 6,193,300 B1 | * | 2/2001 | Nakatomi et al. ...... | 296/107.08 |
| 6,270,144 B1 | * | 8/2001 | Schenk .................... | 296/107.08 |
| 6,318,792 B1 | * | 11/2001 | Neubrand et al. ...... | 296/107.08 |
| 6,352,298 B1 | * | 3/2002 | Hayashi et al. ......... | 296/107.08 |
| 6,419,294 B2 | * | 7/2002 | Neubrand ............... | 296/107.08 |

* cited by examiner

Primary Examiner—Lori L. Coletta
(74) Attorney, Agent, or Firm—Jordan and Hamburg LLP

(57) ABSTRACT

A convertible (1) with a roof (2), which can be stowed in the rear region (3) of the vehicle beneath a lid part (4), it being possible to open and close the lid part (4), on the one hand, for unblocking an opening (7) for the passage of the roof (2) adjacent to the front region (4a) of the lid part (4) and, on the other, for unblocking an opening (8) for luggage, adjacent to the rear end region (9), an auxiliary frame (11) being disposed beneath the lid part (4a) and connected in the, in the driving direction (F), pre-disposed area over a multiple joint (14) with the lid part (4) and mounted moveably with respect to the vehicle body in its rear region (12), wherein the multiple joint (14), while the opening (7) for the passage of the roof (2) is unblocked, is held in stood-up position which enlarges the distance between the lid part (4) and the auxiliary frame (11) relative to that of the closed position.

8 Claims, 23 Drawing Sheets

Figure 1:
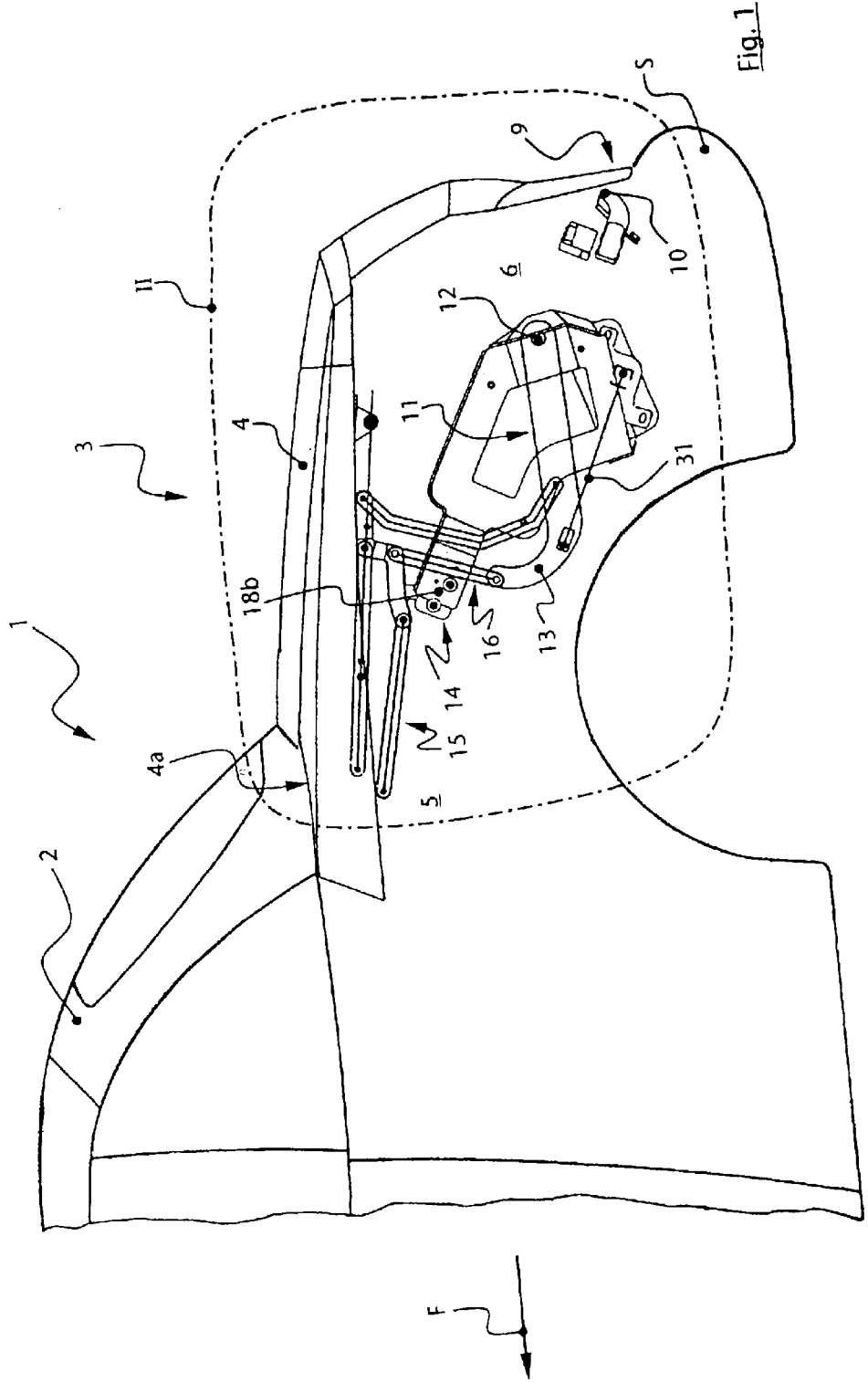

CONVERTIBLE WITH A ROOF, WHICH CAN BE STOWED IN THE REAR REGION OF THE VEHICLE BELOW A LID

BACKGROUND OF THE INVENTION

The invention relates to a convertible with a roof which can be stowed in the rear region of the vehicle below a lid.

The DE 197 56 062 C1 discloses a convertible with a lid part, which can be opened and closed, on the one hand, for unblocking an opening adjacent to its front end region for the passage of the roof and, on the other, for unblocking an opening for luggage, adjacent to its rear end region. In the opened position of the roof, the lid part covers the roof. The lid part is held by means of an auxiliary frame, which is hinged in the rear region of the body of the vehicle and, in the region, which is the front end region in the direction of travel, is connected over a multiple joint with the lid part. While the lid part is being opened in order to unblock the opening for accommodating luggage, the multiple joint opens up, so that a swiveling motion of the lid part results in an opening sense enclosing an obtuse angle with the driving direction. Due to the opening of the multiple joint, an upward motion of the front end region of the lid part also takes place simultaneously during this opening process. When the lid part is opened to unblock the opening for the passage of the roof, the multiple joint in one example is locked by a lock. In a further example, the locking can be canceled, since a defined motion of the multiple joint is possible over a crankshaft drive. While the roof is being opened, the multiple joint changes over from an extended position into a retracted position, so that the lid part lies flat against the auxiliary frame. Since the lid part, during the opening process in the last-mentioned sense, swivels about a rear hinge in the region of the upper edge of the bumper, the auxiliary frame must be disposed fairly far to the rear, in order to avoid that the lid part and the auxiliary frame tilt mutually towards one another. As a result, the hinge point of the auxiliary frame must be placed as an unfavorable position, since this area should remain for the taillights.

SUMMARY OF THE INVENTION

It is an object of the invention to improve a convertible with regard to the opening kinematics of the lid part.

With the inventive setting up or opening of the multiple joint when opening the lid part for unblocking the opening for the passage of the roof, the vertical distance between the auxiliary frame and the lid part is increased during the opening process. With that, a short lateral arm of the auxiliary frame can be formed, which is extended essentially in the vertical direction by the setting up of the multiple joint when the opening for the passage of the roof is unblocked. Because of the shortness of the lateral arm of the auxiliary frame, its mounting can be shifted towards the front from the rear region. With that, the space for the taillights does not become restricted. Their accessibility, as well as the trunk in this region, are fully maintained.

If the multiple joint comprises at least two coupled partial joints, one of which is assigned to the auxiliary frame and the other to the lid part, these partial joints can mutually effect one another by the movement of the auxiliary frame and, during the opening process of the lid part for unblocking an opening for the passage of the roof, be transferred as a whole into a stand-up motion, the lower partial joint, due to the driven motion of the auxiliary frame over the coupling part, bringing about the standing up of the upper partial joint. There is a defined stand-up motion of the upper partial joint, which makes do without further driving or guiding aids.

When the partial joints are connected with one another over a coupling body, which is freely moveable outside of its connection to these, no further installation is required for these at the car body. If, for example, the partial joints are constructed in each case as quadruple joints, the installation at the vehicle is limited to fixing two joint points of the lower partial joint to the car body and fixing two joint points of the upper partial joint to the lid part. The installation work therefore is not greater than that for a simple quadruple joint.

In the version of the multiple joint, which is to be opened as a whole, the multiple joint preferably is a quadruple joint, two joint points being assigned to the lid part and two to the auxiliary frame. The joint points, assigned to the auxiliary frame and the lid part, can then be connected with one another over guide rods, which, in the opening position, bridge the distance between the auxiliary frame and the lid part. In the closed position, these guide rods are aligned essentially horizontally and parallel to the side arms of the auxiliary frame, so that they can be held in the side area without reducing the capacity of the trunk to an extent worth mentioning.

Further advantages and details arise out of the examples of the object of the invention, which are described below and shown in the accompanying drawings.

IN THE DRAWINGS

Figure 2:
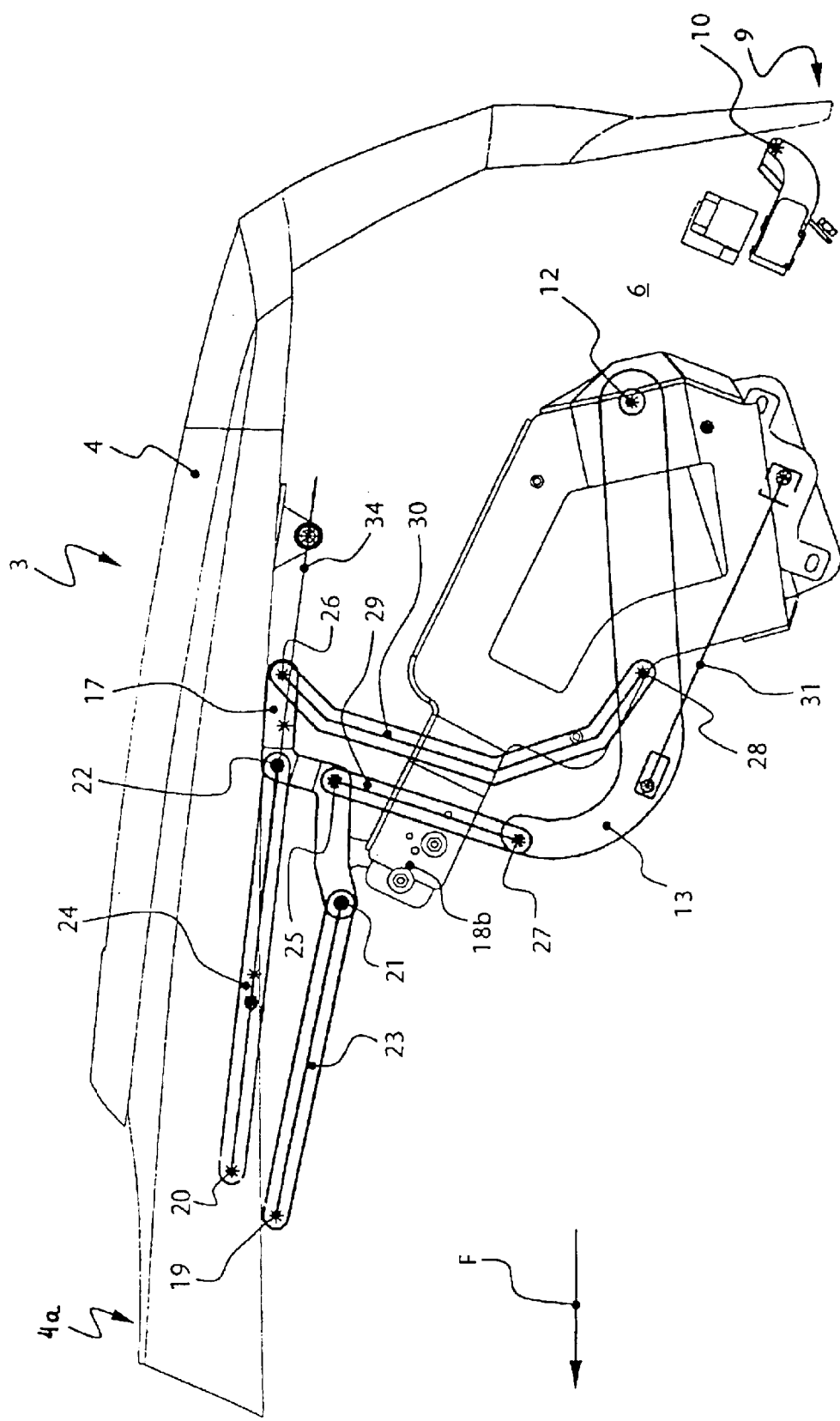

FIG. 1 shows a diagrammatic side view of the rear part of a convertible of a first version in a closed position, FIG. 2 shows the detail II of FIG. 1

Figure 3:
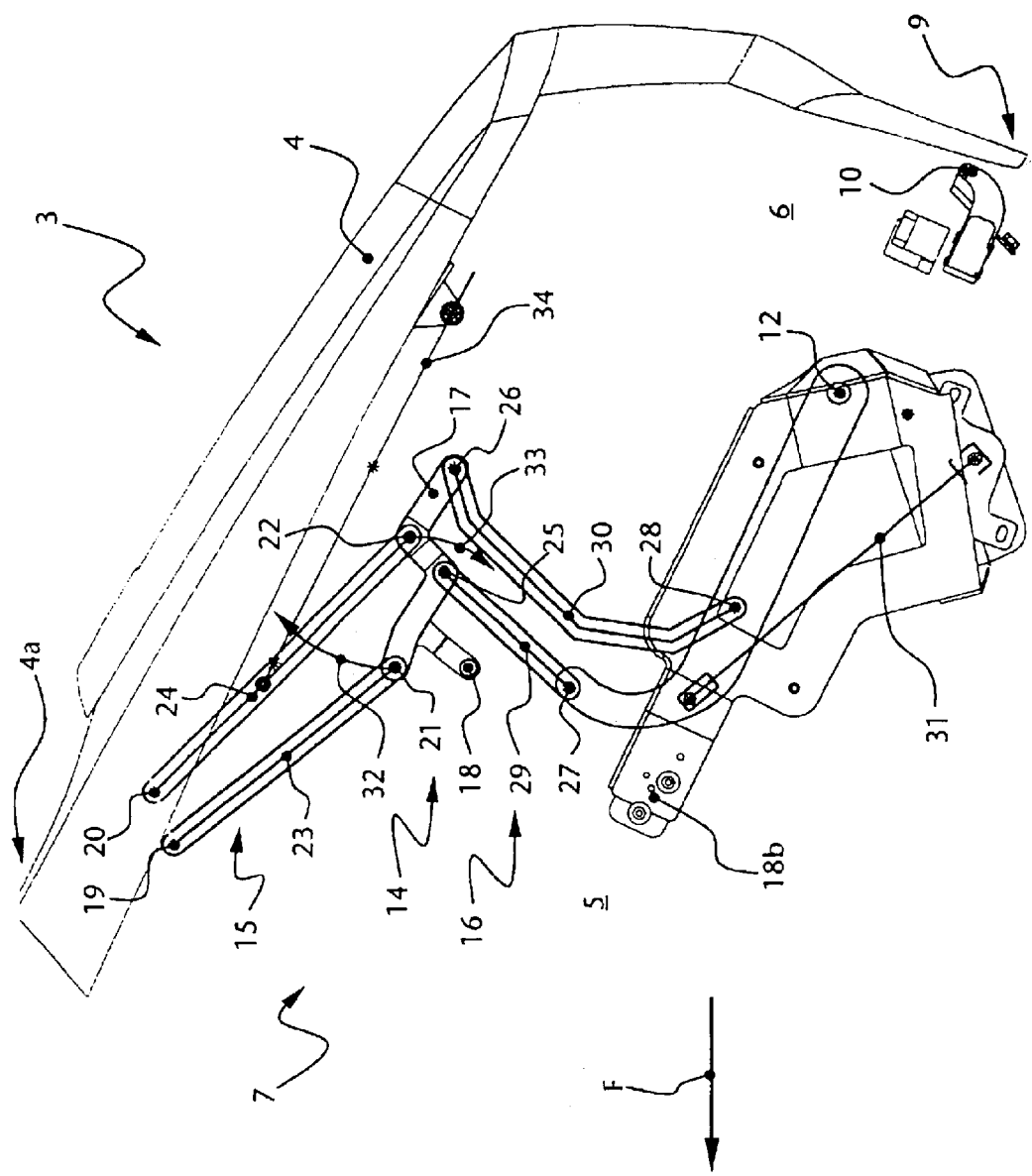
Figure 4:
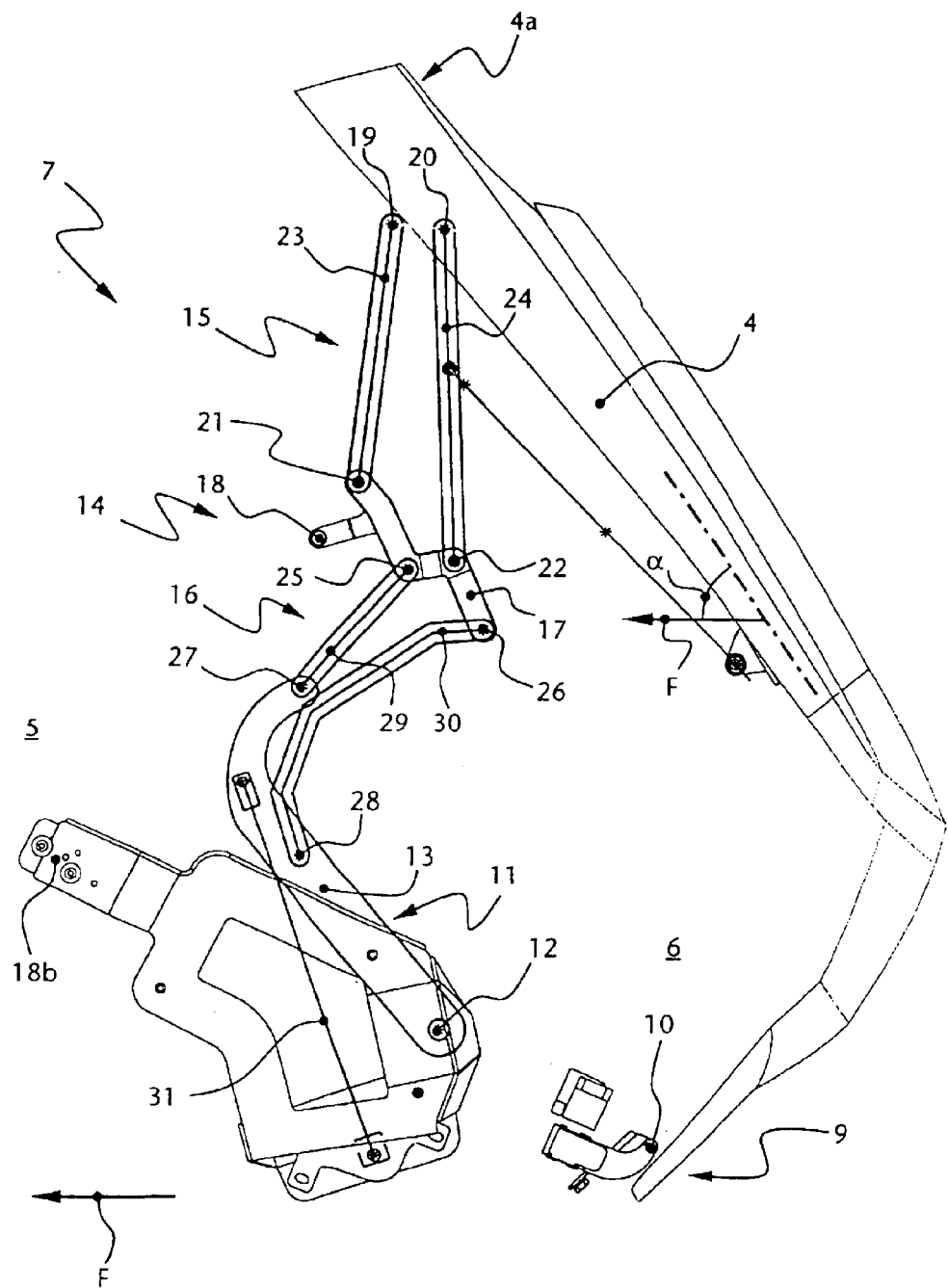
Figure 5:
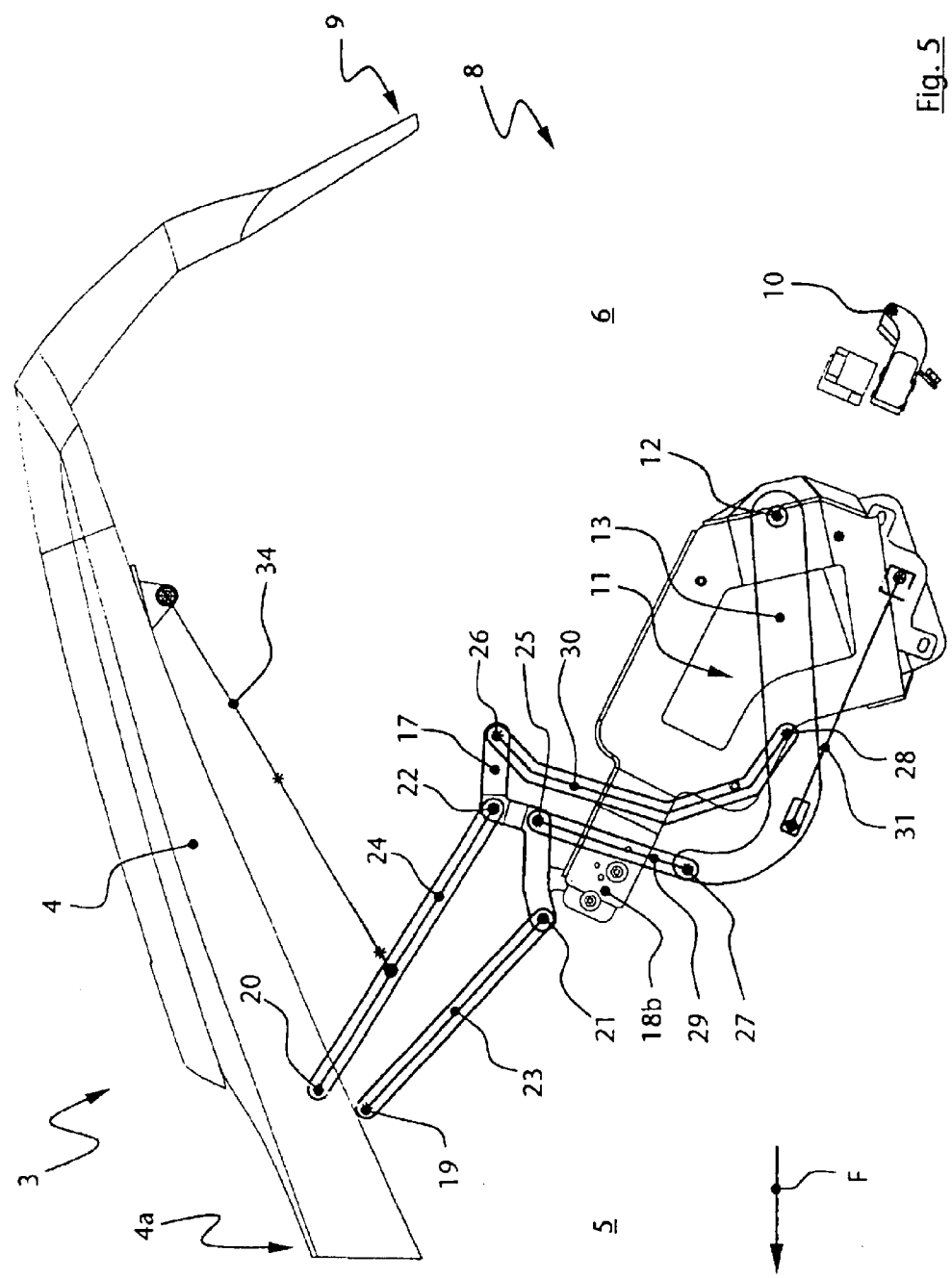
Figure 6:
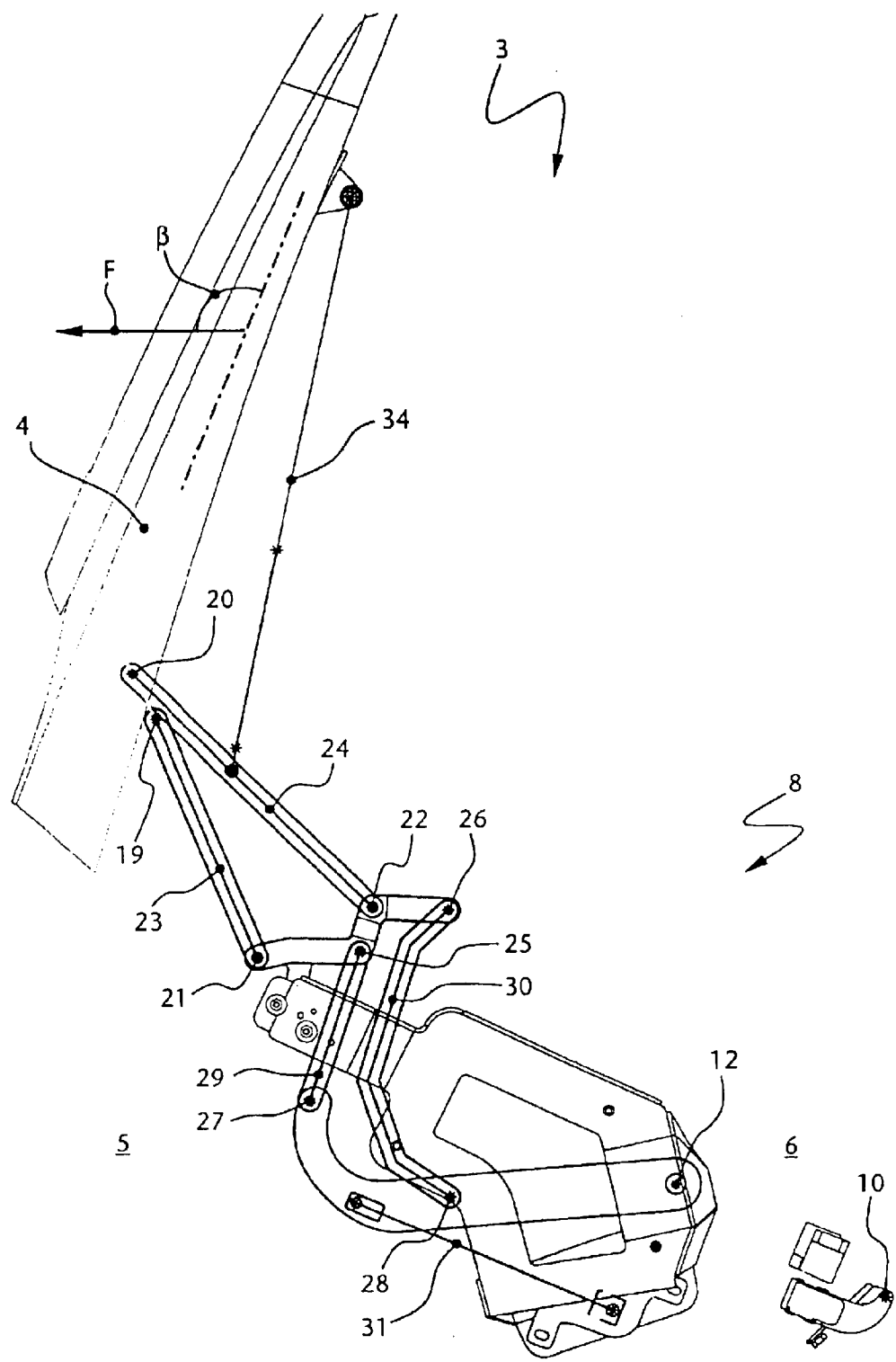
Figure 7:
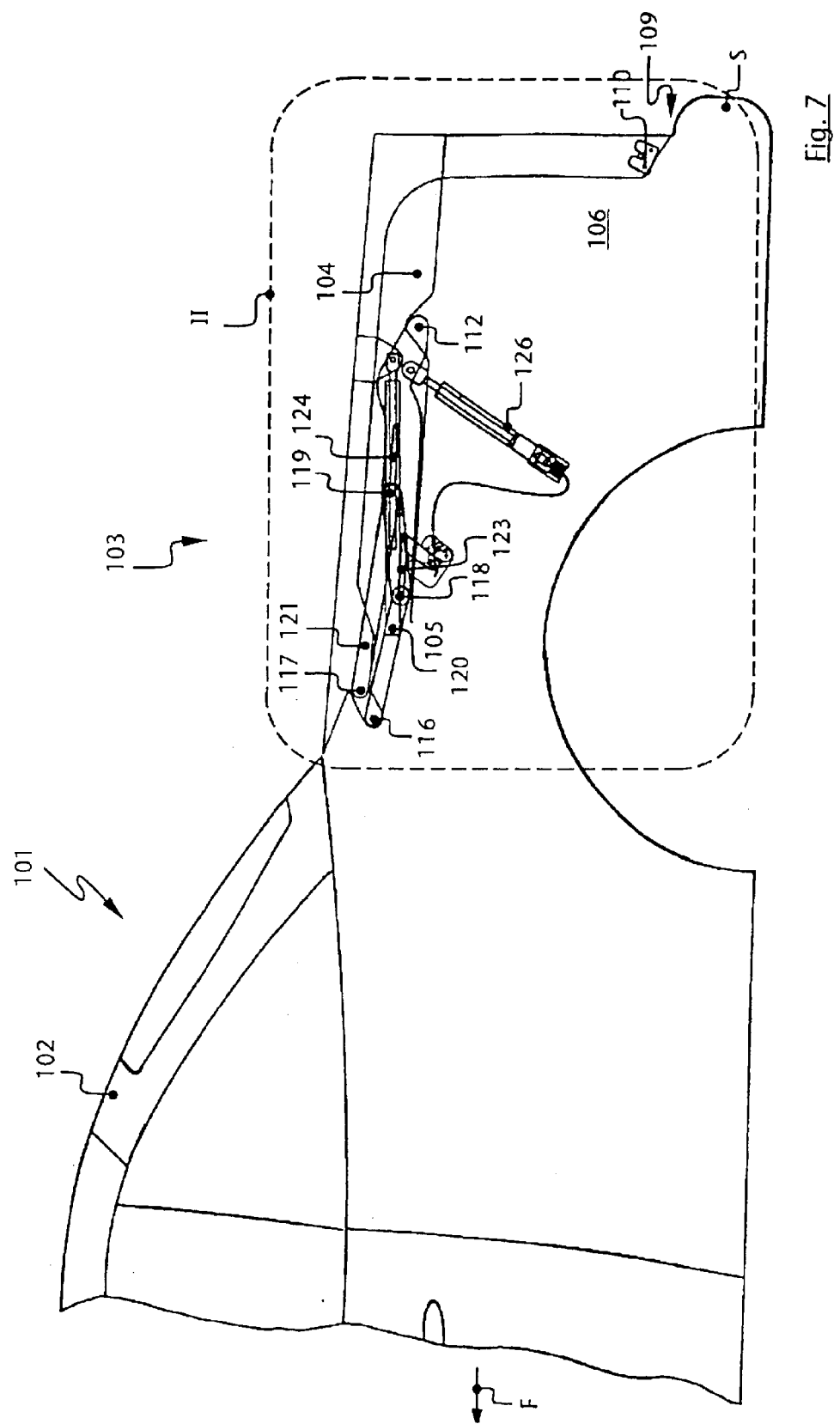
Figure 8:
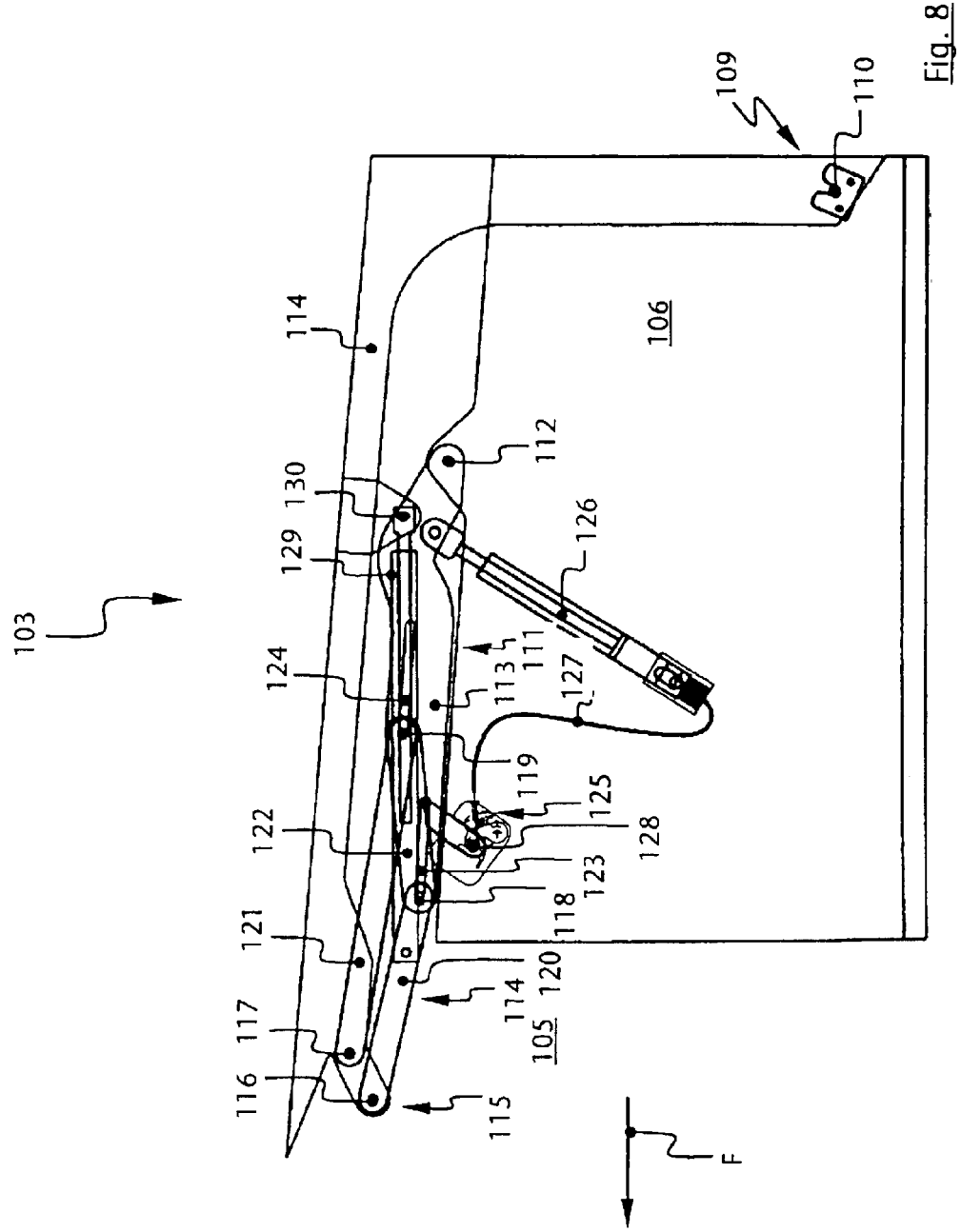
Figure 9:
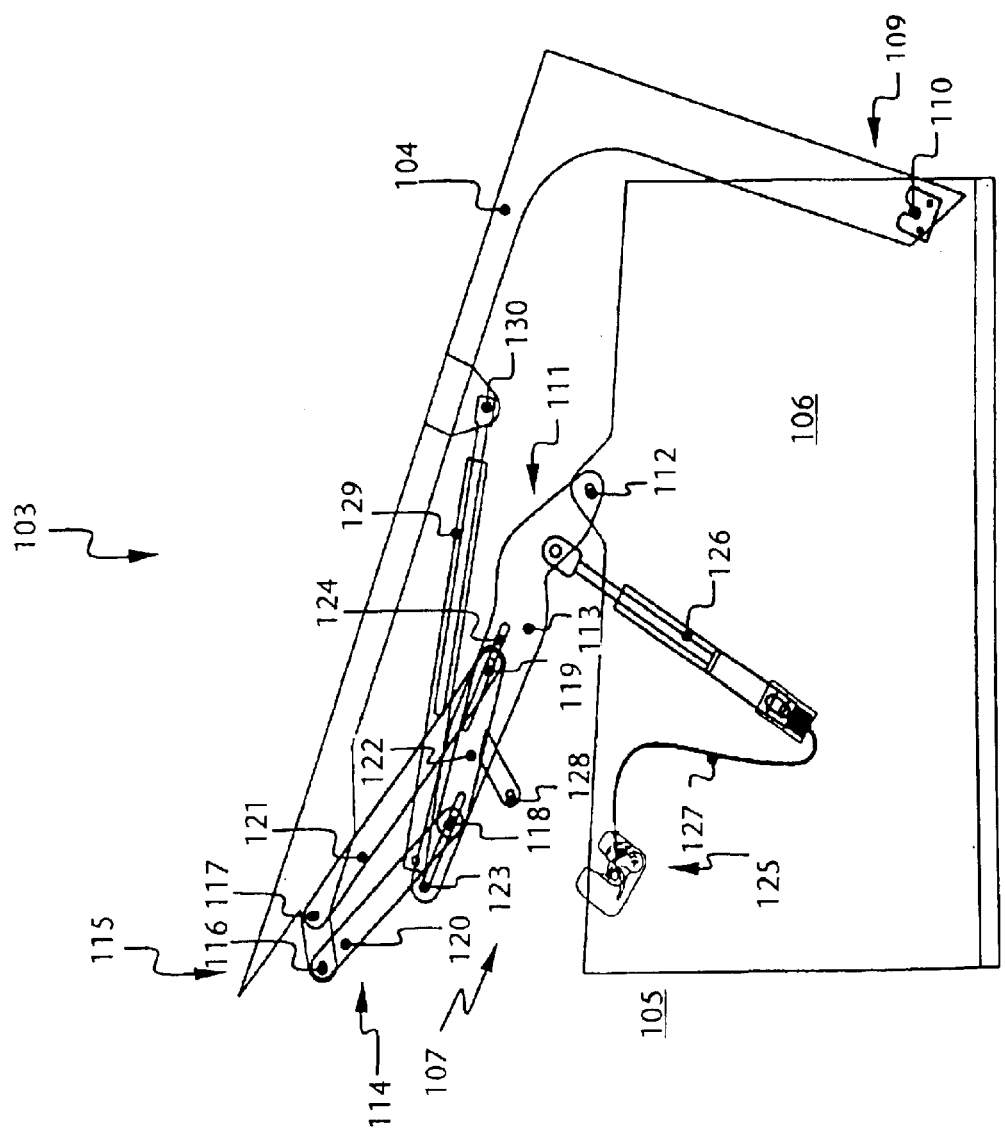
Figure 10:
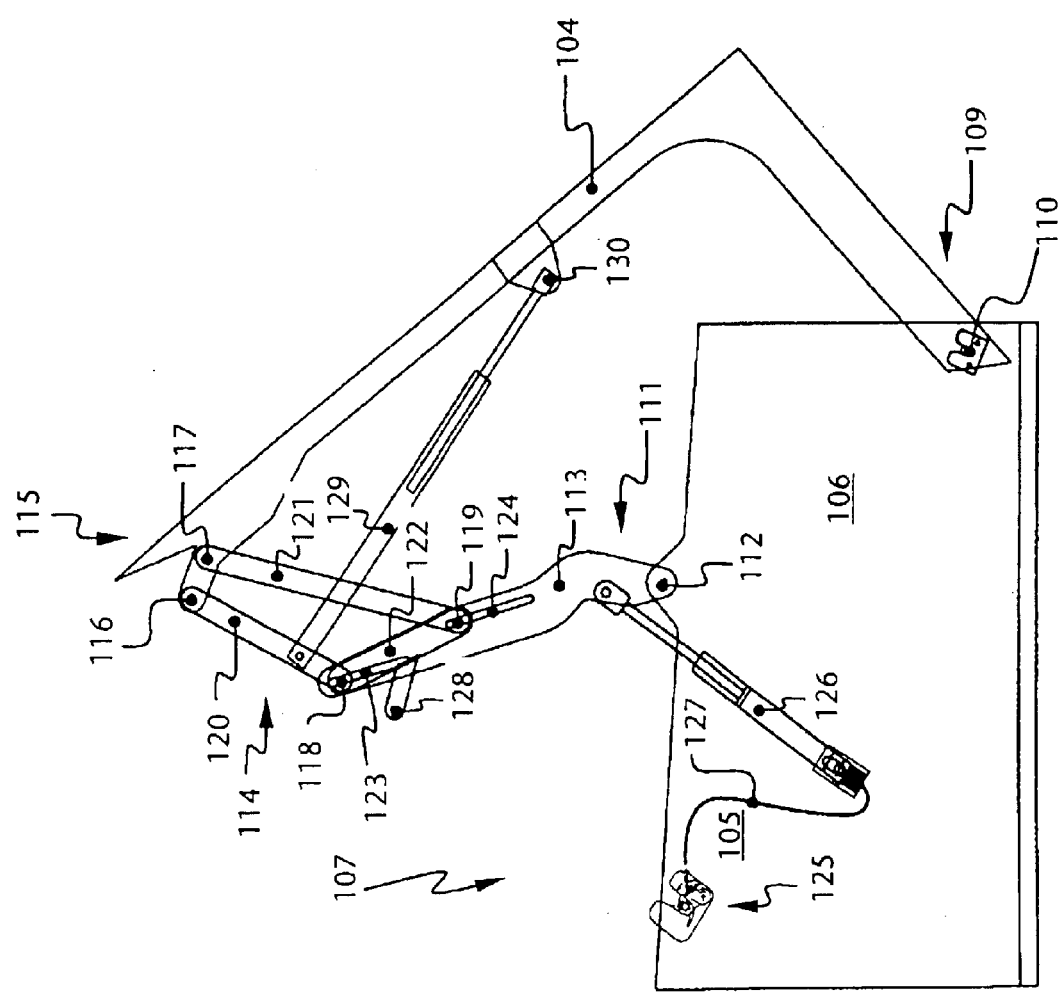
Figure 11:
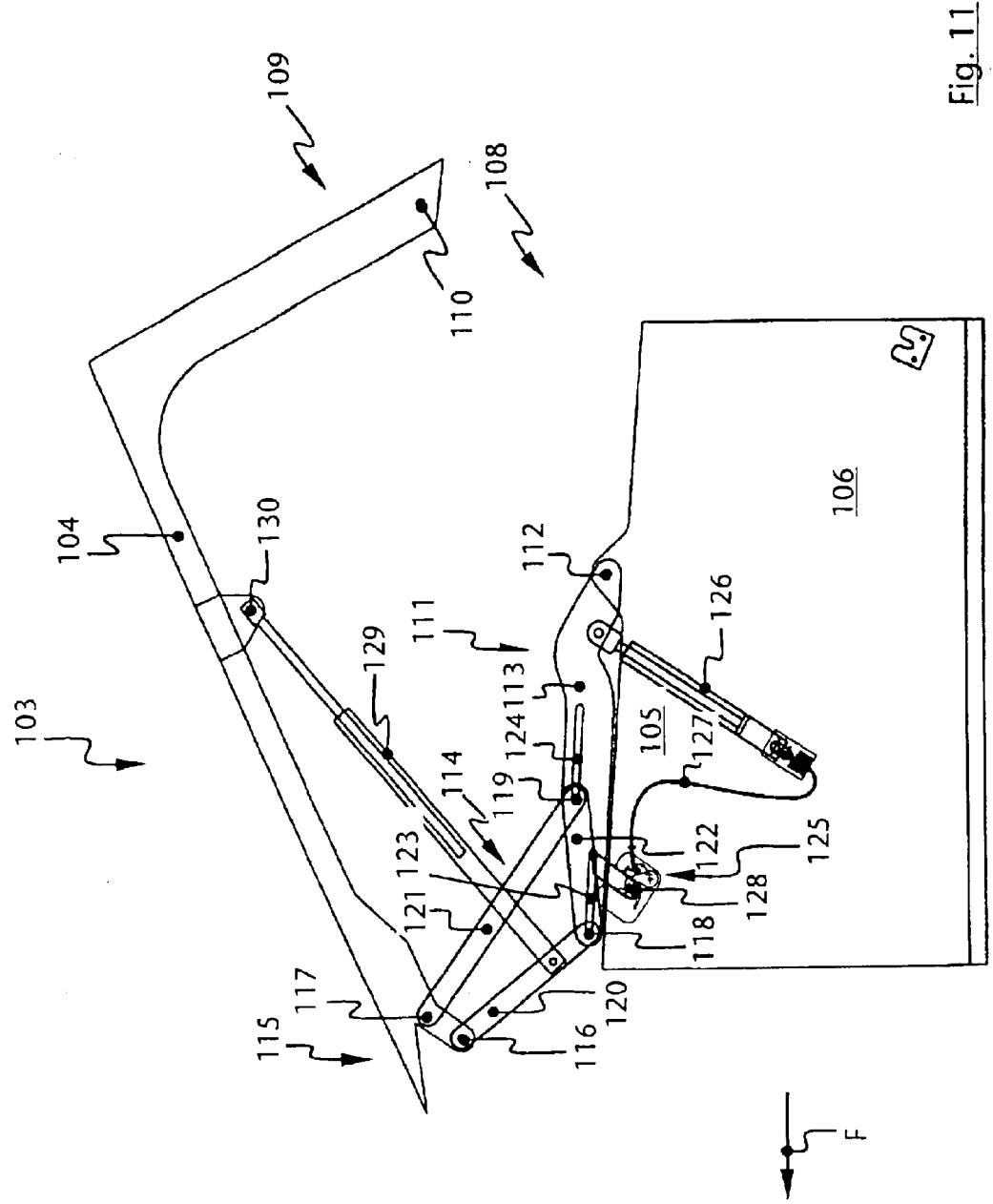
Figure 12:
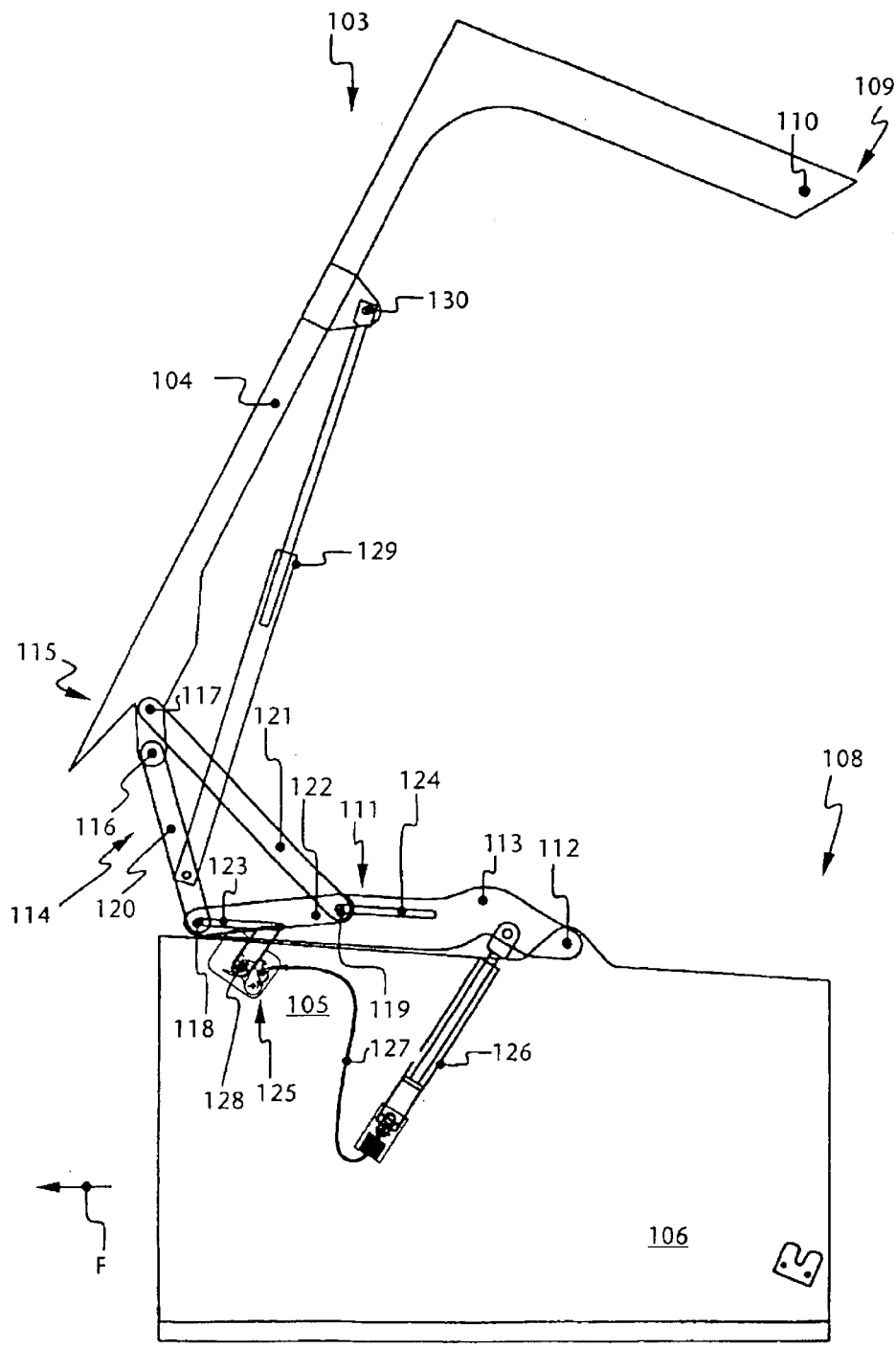
Figure 13:
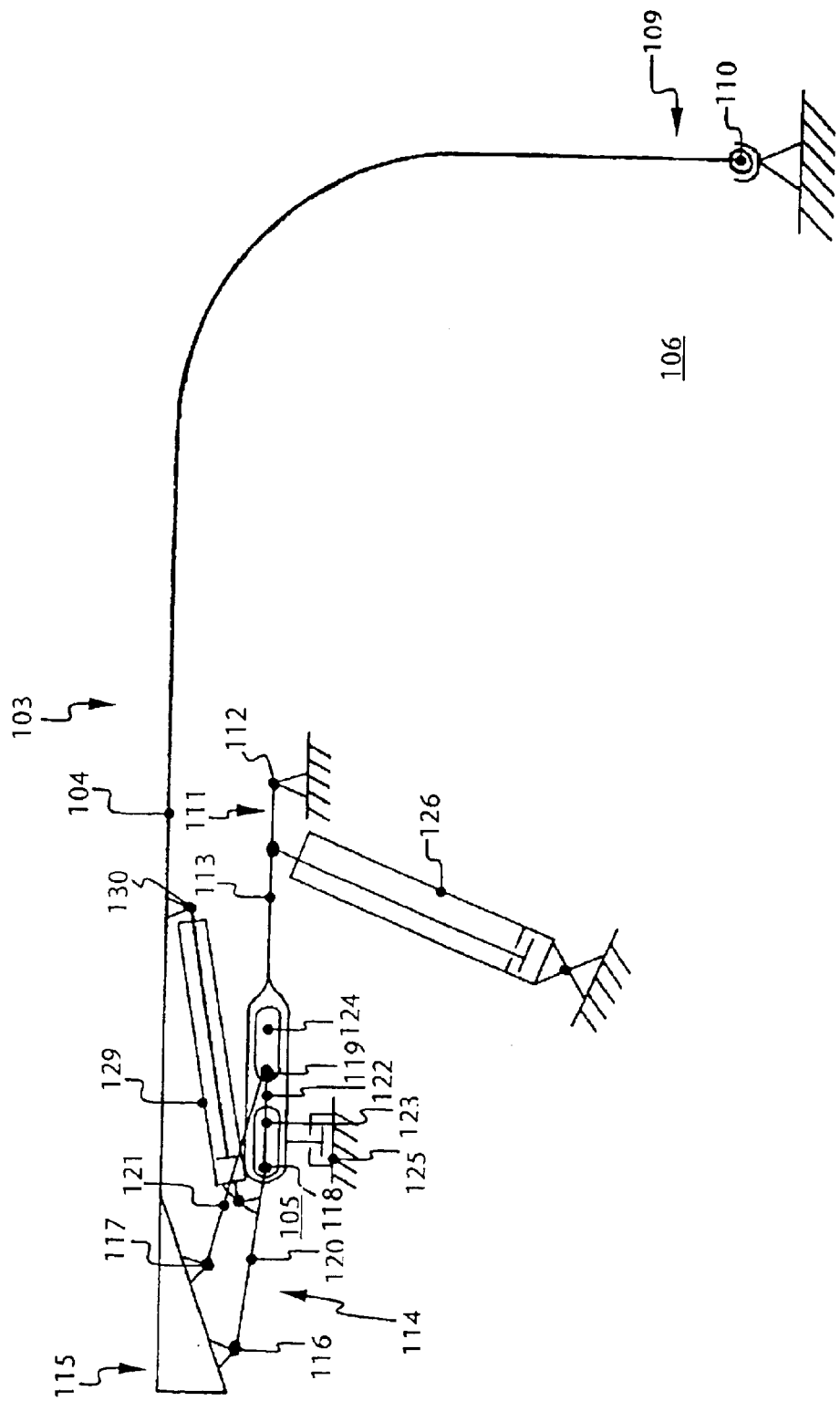
Figure 14:
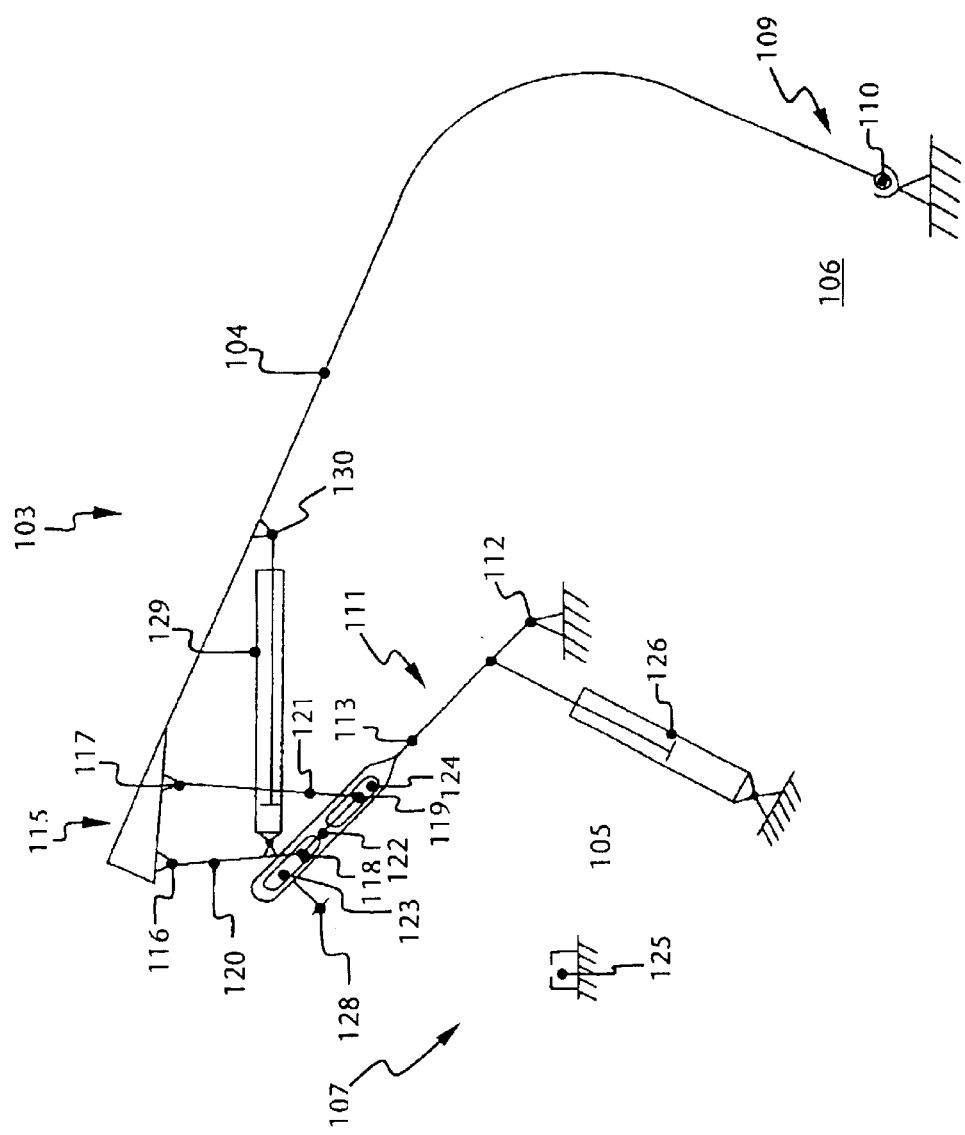
Figure 15:
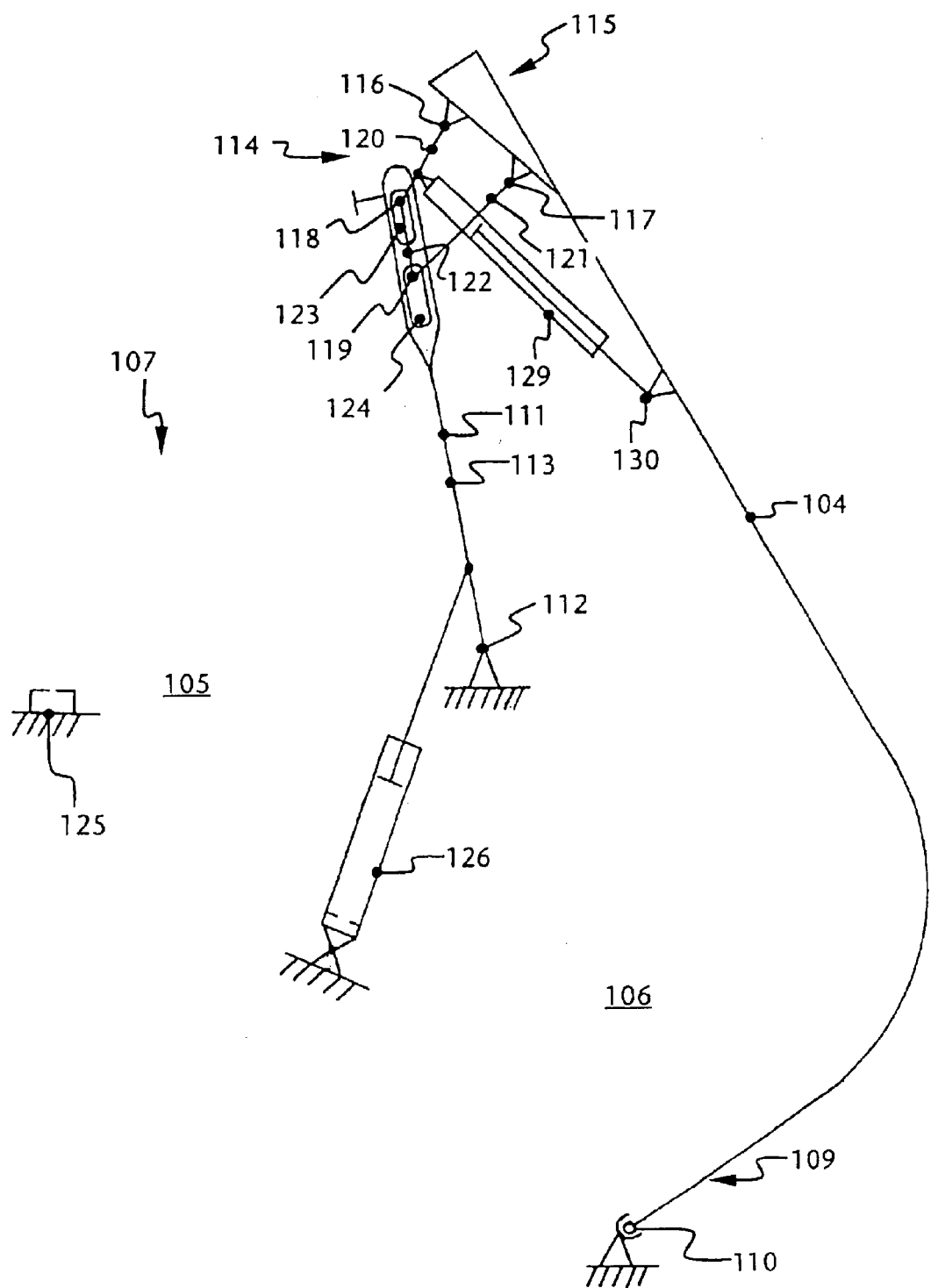
Figure 16:
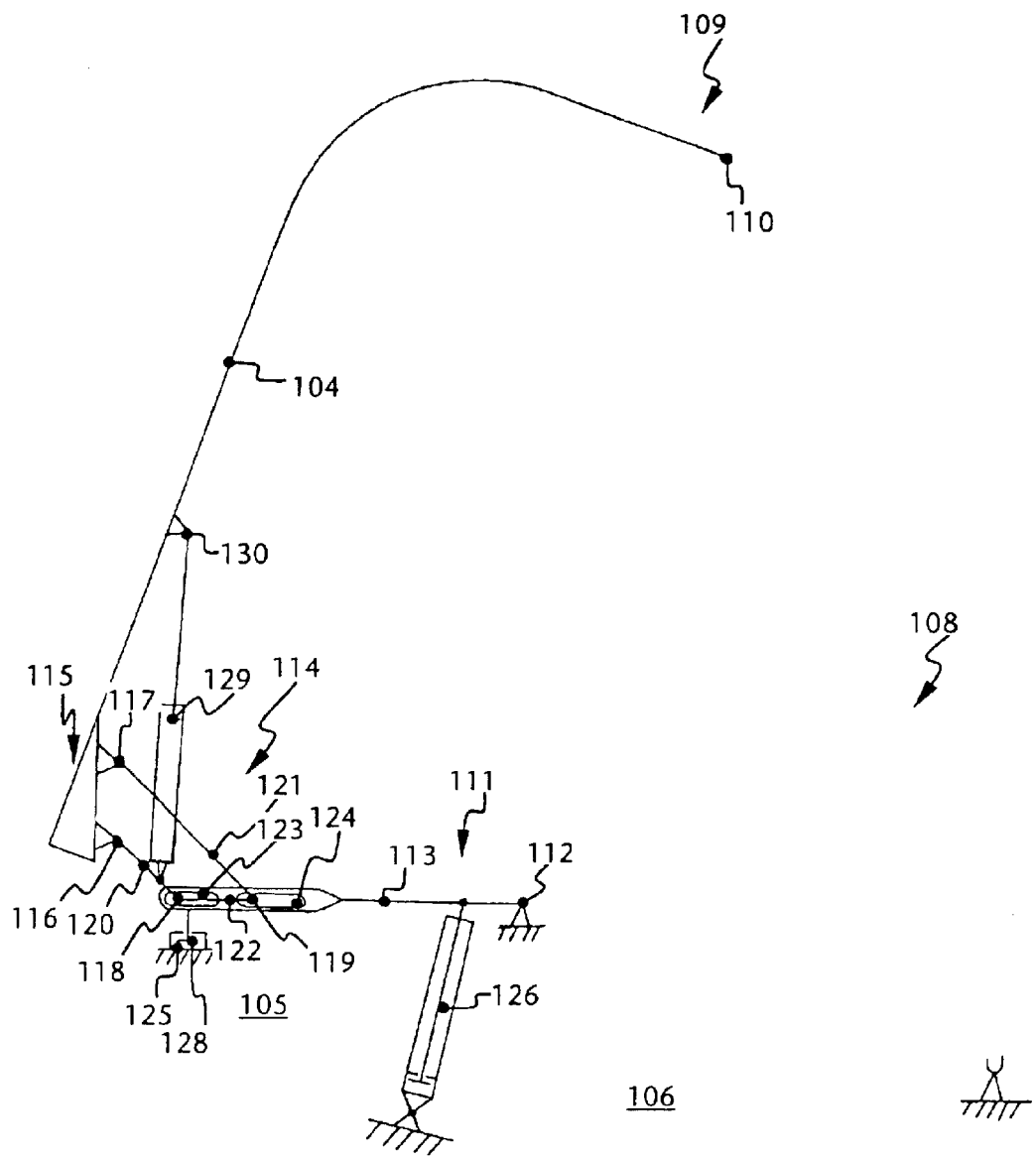
Figure 17:
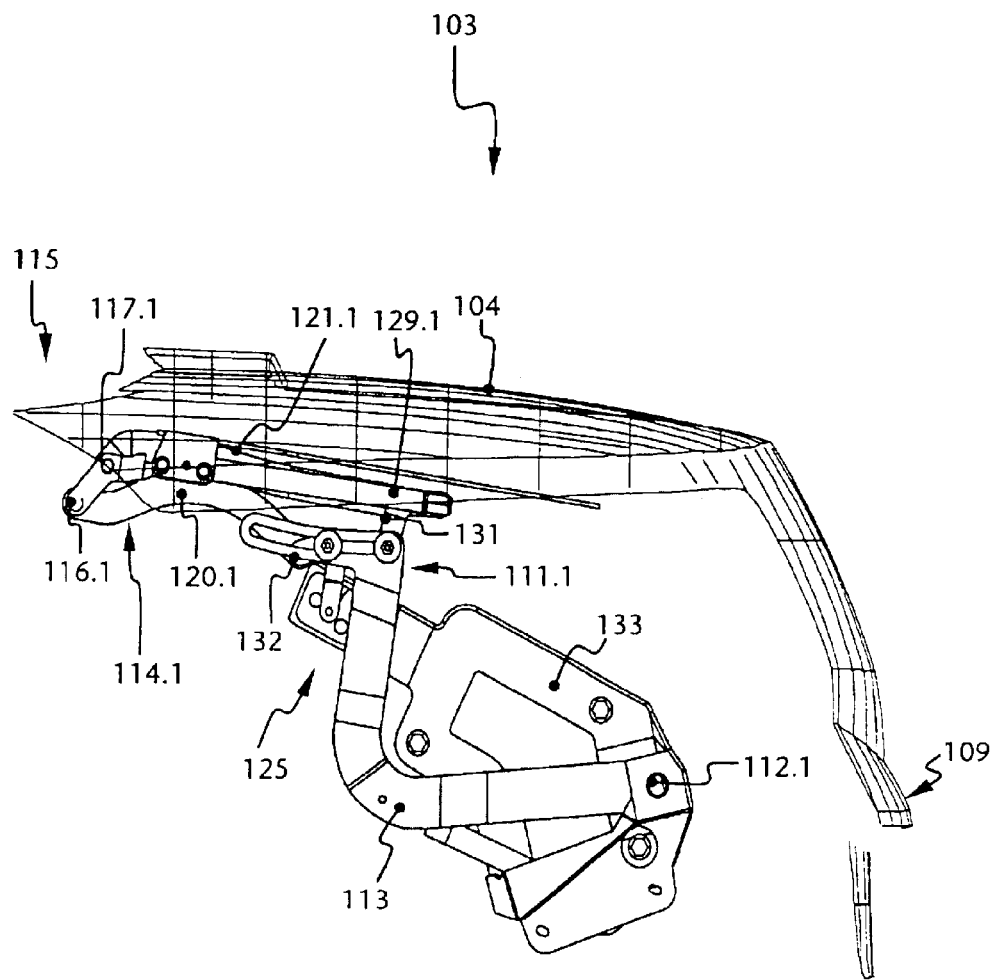
Figure 18:
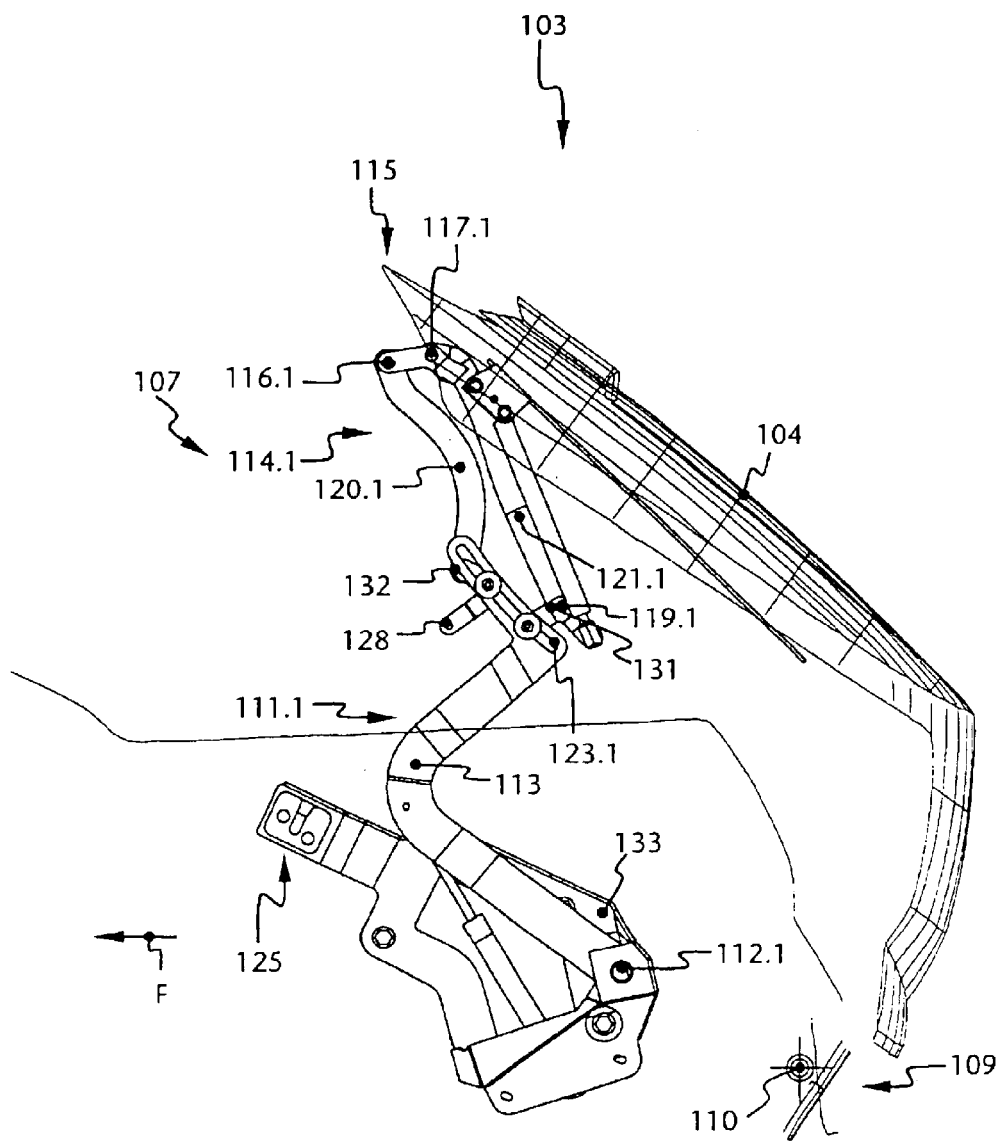
Figure 19:
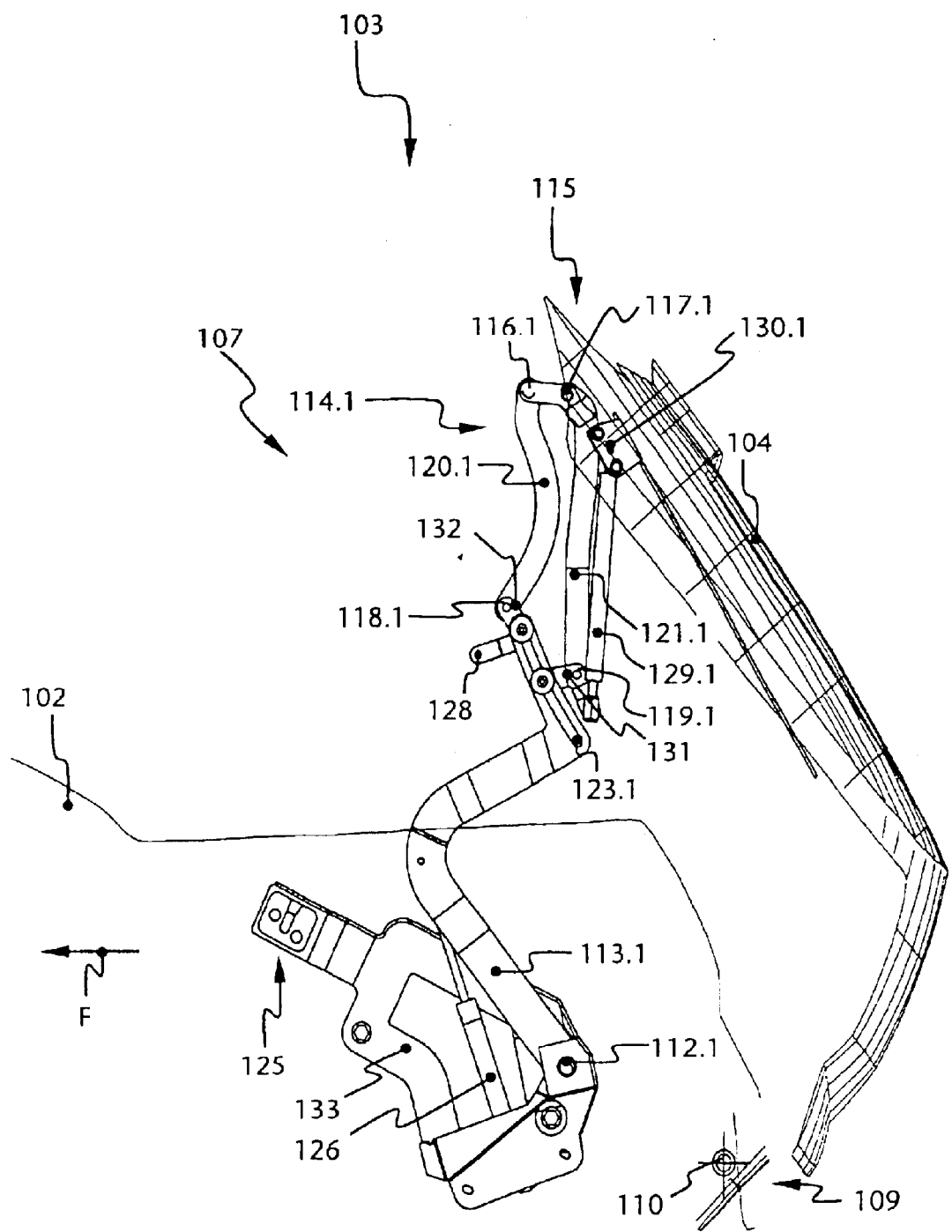
Figure 20:
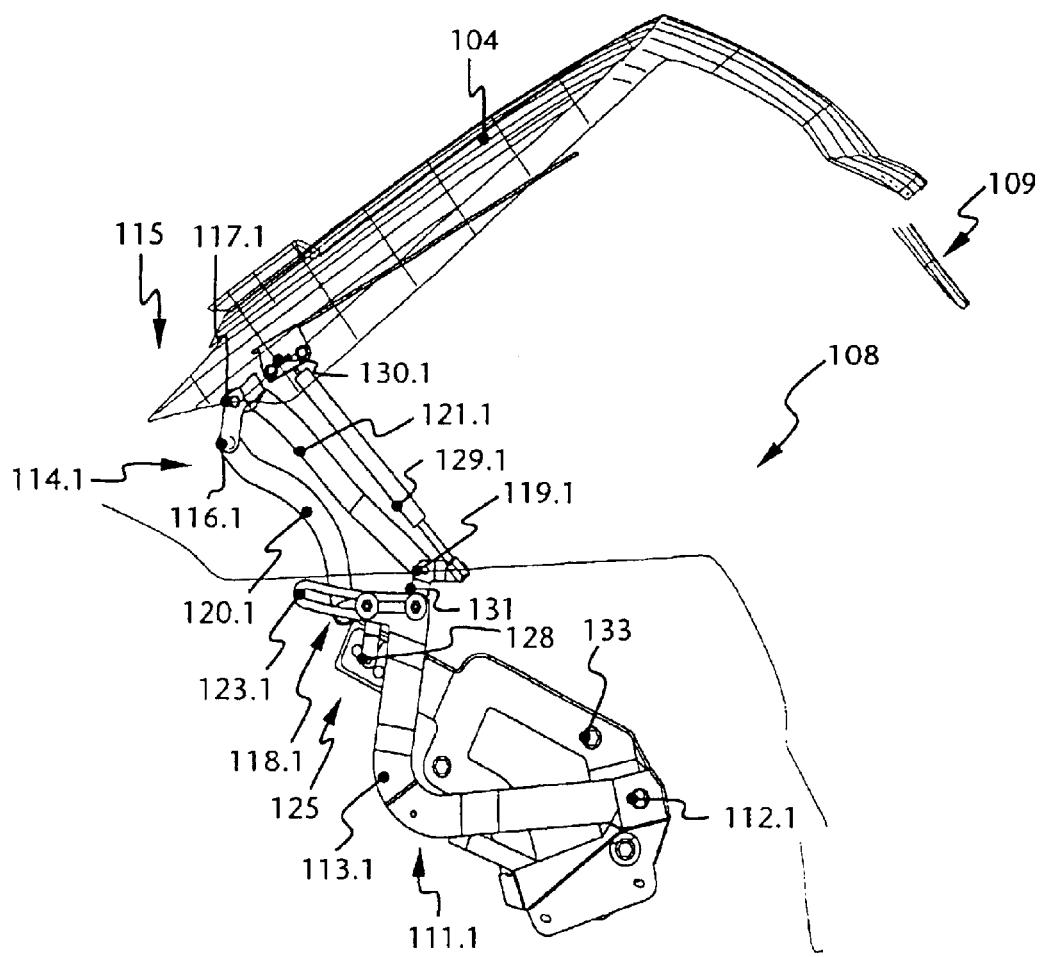
Figure 21:
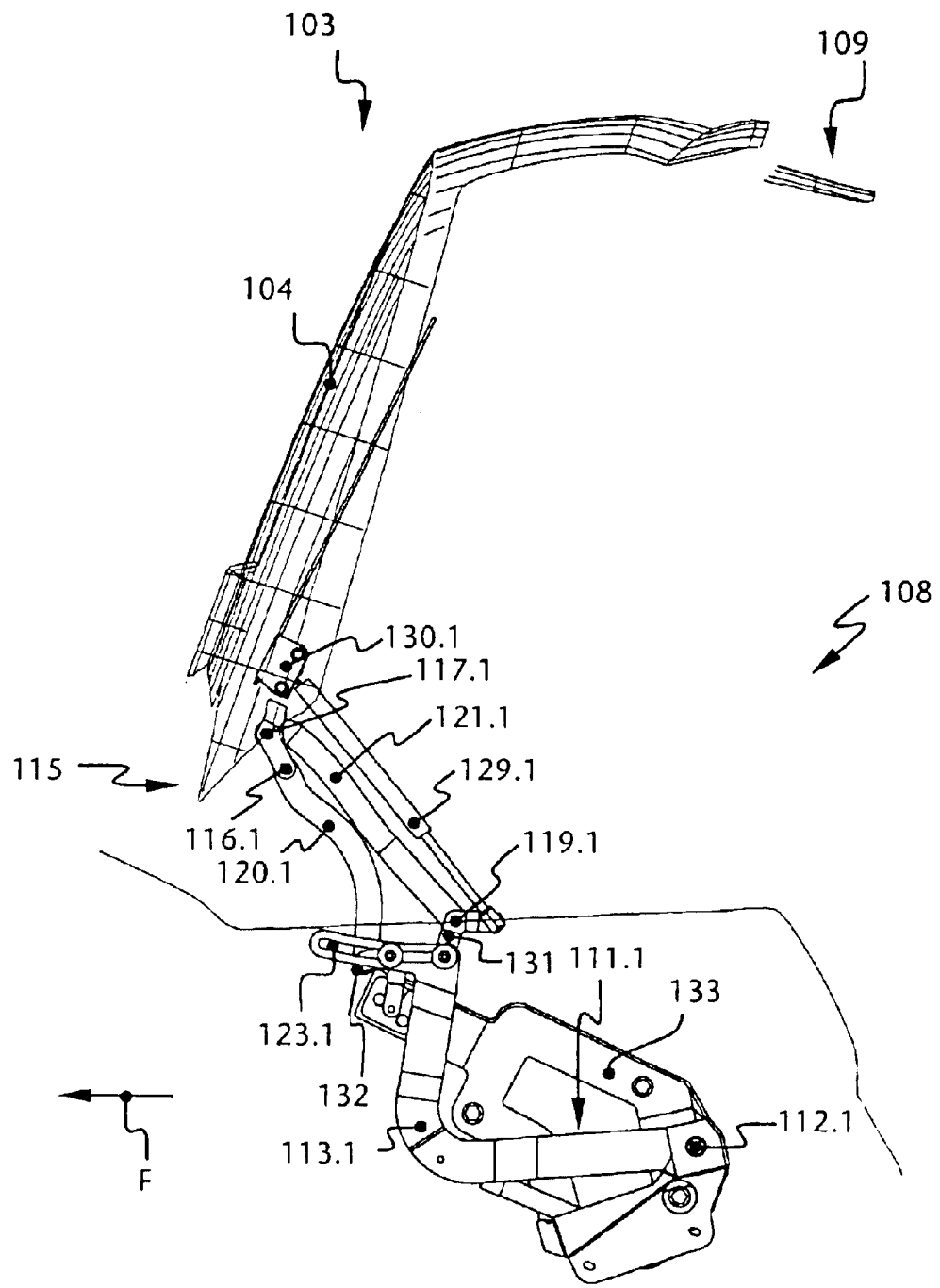
Figure 22:
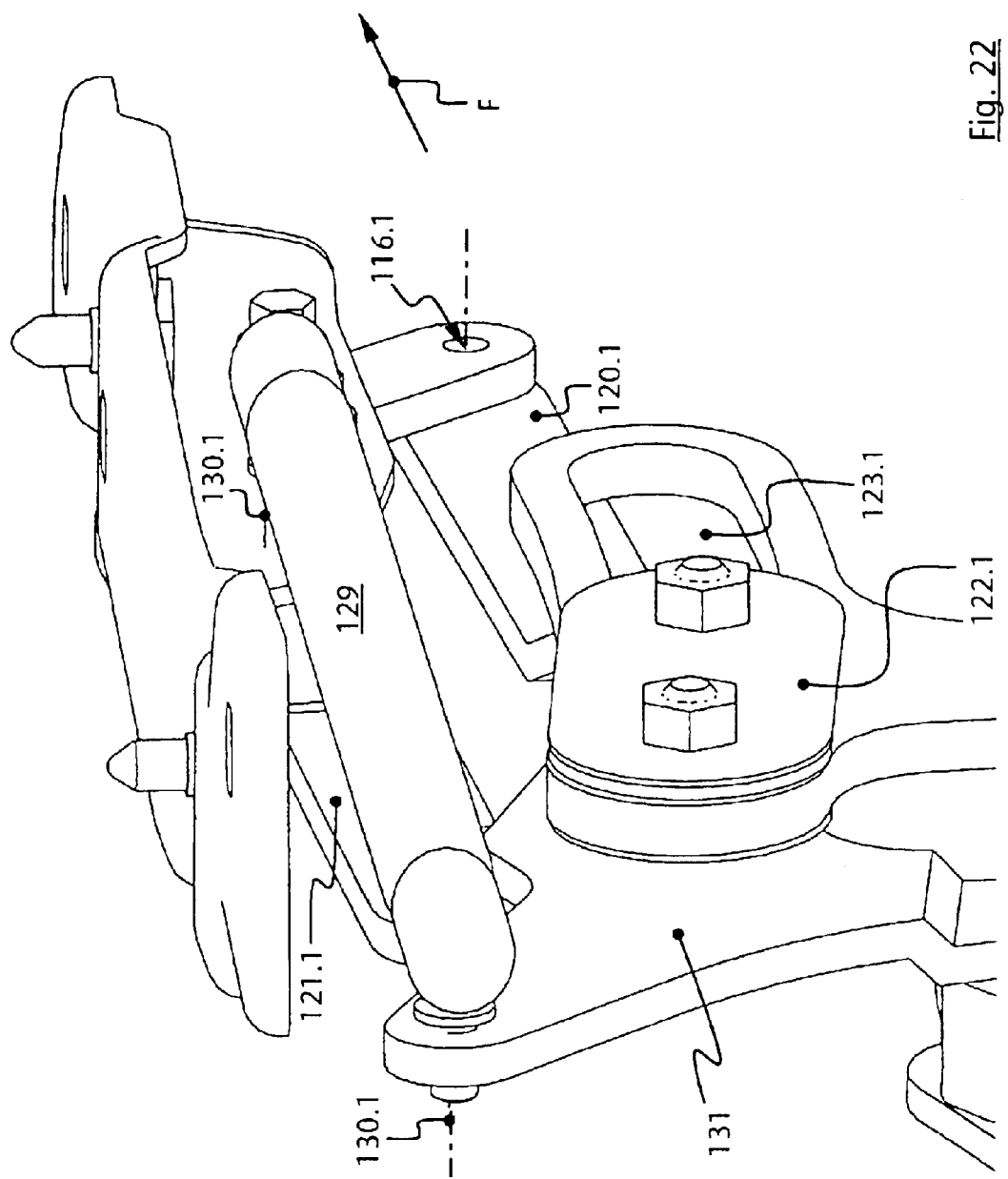
Figure 23:
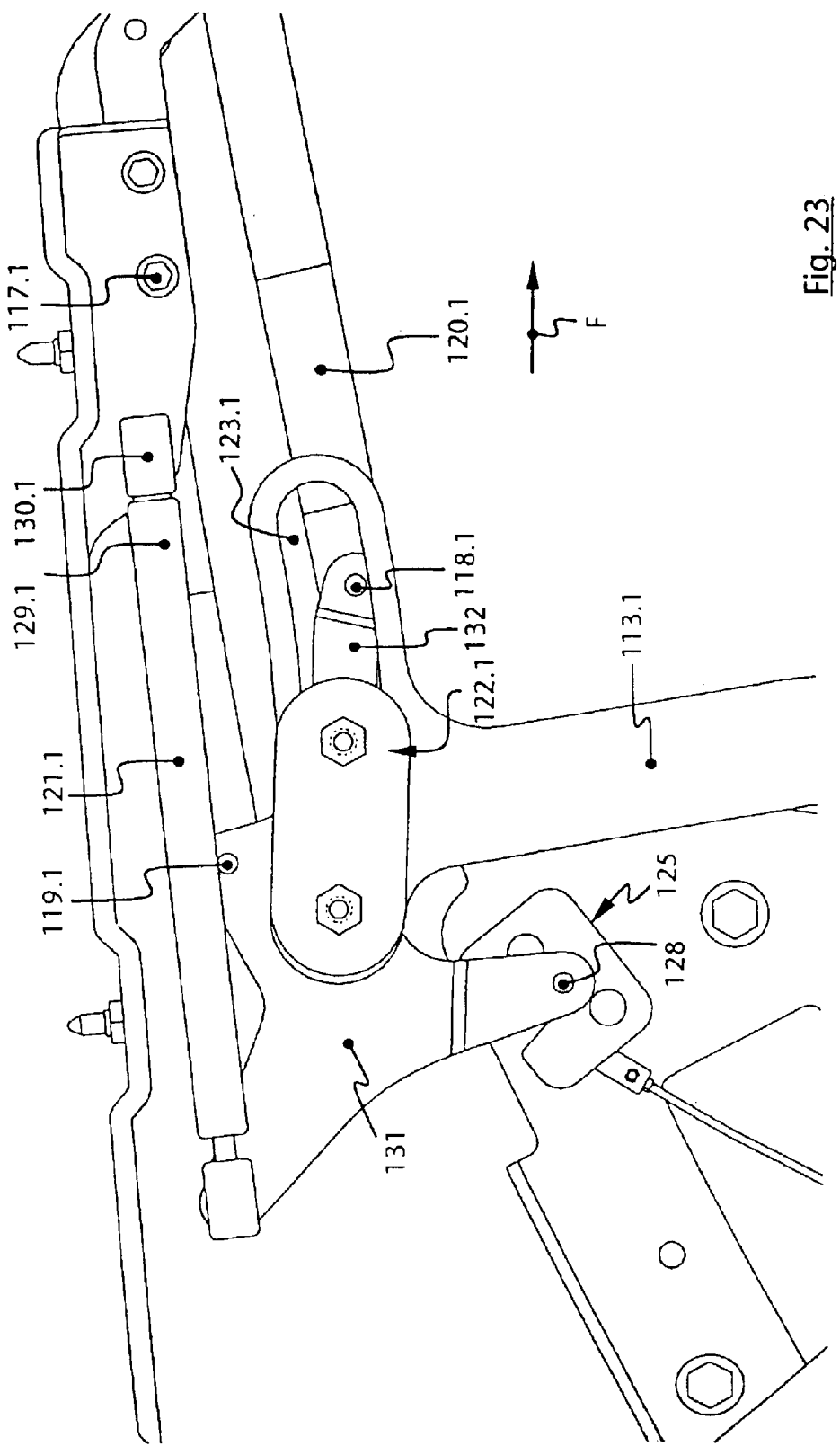

FIG. 3 shows a view, similar to that of FIG. 2, during the opening process for unblocking the opening for the passage of the roof, FIG. 4 shows a view, similar to that of FIG. 3, during the further swiveling up of the lid part, FIG. 5 shows a view, similar to that of FIG. 2, during the opening process of the lid part for unblocking the opening for accommodating luggage, FIG. 6 shows a view, similar to that of FIG. 5, as the opening process continues, FIG. 7 shows a diagrammatic side view of the rear part of a convertible of a second version with a quadruple joint, two joint points of which are guided in separate sliding-block guides of the auxiliary frame, in the closed position, FIG. 8 shows the detail VIII of FIG. 7, FIG. 9 shows a view, similar to that of FIG. 8, during the opening of the lid part for unblocking the opening for the passage of the roof, FIG. 10 shows a view, similar to that of FIG. 9, during the further swiveling up of the lid part, FIG. 11 shows a view, similar to that of FIG. 8, during the opening process of the lid part for unblocking the opening for accommodating the luggage, FIG. 12 shows a view, similar to that of FIG. 11, during the further opening process, FIG. 13 shows a diagrammatic view of the position of the operational parts in the position of FIG. 8, FIG. 14 shows a diagrammatic representation of the operational parts of FIG. 9, FIG. 15 shows a diagrammatic representation of the operational parts of FIG. 10, FIG. 16 shows a diagrammatic representation of the operational parts of FIG. 12, FIG. 17 shows a view, similar to that of FIG. 8 of an alternative example, FIG. 18 shows a view, similar to that of FIG. 17, during the opening process of the lid part for unblocking the opening for the passage of the roof, FIG. 19 shows a view, similar to that of FIG. 18, with the lid part open completely, FIG. 20 shows a view, similar to that of FIG. 17 during the opening process of the roof part for unblocking the opening for accommodating luggage, FIG. 21 shows a view, similar to that of FIG. 20, with the lid part completely opened FIG. 22 shows a detailed view of the side arm of the auxiliary frame, as seen obliquely from the rear, and FIG. 23 shows a detailed view of the guiding of the joint points in the curved sliding-block guide.

DESCRIPTION OF THE PREFERRED EMBODIMENTS

In FIG. 1, a convertible vehicle 1 of a first example is shown in a truncated version. It is provided with a regionally flexible or totally rigid roof 2, which is constructed as a folding top. The roof 2 can be stowed in the rear region 3 of the vehicle below a lid part 4. When the roof 2 is opened up, the part 4 has the double function of covering the space 5 for accommodating the opened roof 2, as well as a space, for accommodating luggage.

For unblocking a roof-accommodating opening 7 (FIG. 3, FIG. 4), the lid part 4 can be opened at an acute angle α with the driving direction F. Furthermore, an opposite opening process (FIG. 5, FIG. 6) of the lid part 4 with inclusion of an obtuse angle β to the driving direction F is possible for unblocking an opening 8 for loading or unloading the trunk 6. At its rear end region 9, the lid part 4 is held at a hinge device 10, which ensures that the lid part 4 is fixed in the completely closed state (FIG. 1, FIG. 2), as well as when the opening 7 is unblocked for the passage of the roof 2 (FIG. 3, FIG. 4). In order to ensure a small gap in the transition between the lid part 4 and a bumper S, the hinge device 10 is constructed for carrying out a swiveling motion only.

The lid 4 is held by the rear hinge 10 as well as by the auxiliary frame 11, which is held pivotably in its rear region at the body of the vehicle by a drag bearing 12. The auxiliary frame 11 comprises two side arms 13, which are assigned to the sides of the vehicle and extend from the drag bearing 12 in the driving direction F along two vertical longitudinal planes and are connected at their pre-disposed end, diverted from the main bearing 12, with a multiple joint 14, which is connected at the other end with the front end region 4a of the lid part 4.

In the example, the multiple joint 14 comprises two partial joints 15, 16, which are coupled to one another and one of which is assigned to the lid part 4 and the other to the auxiliary frame 11. The partial joints 15, 16 are connected to one another over an inherently rigid coupling body 17. The coupling body 17 is constructed as a multi-angular guide rod, which lies in the plane of motion of the side arms 13. In the opened position of the lid part 4 it is freely movable for unblocking the opening 7 for the passage of the roof 2 and held only over the partial joints 15 and 16. In the closed position of the lid part 4, as well as in the opened position for unblocking the opening 8 for accommodating luggage, the coupling body 17 is blocked in a lock 18b over a catch 18, which is rigidly connected at the front with the coupling body 17. Movement of the coupling body 17 is therefore not possible in these positions.

The partial joints 15 as well as the partial joint 16 in the example are constructed as quadruple joints. However, this is not absolutely necessary. The partial joints 15 comprises two joint points 19, 20, mounted at the lid part 4, and to joint points 21, 22, which are disposed at the coupling body 17. For connecting the lid part 4 and the coupling body 17, the joint points 19 and 21 are connected over a guide rod 23 and the joint points 20 and 22 are connected over a further guide rod 24.

The lower partial joint 16 comprises two joint points 25 and 26, as well as two joint points 27 and 28, which are assigned to the side arms. For connecting the coupling body 17 and the side arm 13, the joint points 25 and 27 are connected over a guide rod 29 and the joint points 26 and 28 are connected over a guide rod 30.

All the joint points 19, 20, 21, 22, 25, 26, 27, 28 are disposed at the respective component (lid part 4 or coupling body 17 or side arm 13), so that they can be swiveled about swiveling axes, which are stationary with respect to the respective component.

In the closed position (FIG. 2), the guide rods 23 and 24 are in an almost horizontal position, while the guide rods 29 and 30 of the partial joint 16, which are assigned to the auxiliary frame 11, are almost vertical. The coupling body 17, at which the guide rods 23, 29, 24, 30, are hinged alternately, namely the joint points 21, 25, 22, 26, lie almost horizontally.

By opening the side arm 13 of the auxiliary frame 11 by means of a driving organ 31, such as a hydraulic cylinder, for unblocking the opening 7 for the passage of the roof 2, a shifting of the partial joint 16 about the rear linkage 12 of the side arm 13 is brought about in a direction opposite to the driving direction F. The two joint points 25, 26, which are assigned to the coupling body 17, are also shifted to the rear, the coupling body 17 becoming movable by release of the lock 18b.

Moreover, the coupling body 17 is tilted at an acute angle with respect to the driving direction F, the joint points 26 being pulled downward with respect to the joint point 25. Owing to the fact that the joint points of the upper partial joint's 15 and the lower partial joint 16 follow one another alternately and the joint point 22 of the guide rod 24 is placed between the joint points 25 and 26, this joint point 22 is also shifted downward with respect to the joint point 21 of the front guide rod 23 of the upper partial joint 15. The partial joint 15 therefore arranges itself vertically (FIG. 4), that is, the guide rods 23, 24, due to the different displacement of their joint points 21, 22 in the direction of the arrows 32, 33, reach the vertical end position of FIG. 4, in which the multiple joint 14 is arranged as a whole, even if the guide rods 29, 30 of the lower partial joint 16 have not been arranged vertically with respect to the starting position (FIG. 1, FIG. 2). Instead, the angular position of these guide rods is changed only slightly from the vertical, even though they have brought about the tilting motion of the coupling body 17 and, with that, the arrangement of the joint point 21 with respect to the joint point 22.

Accordingly, overall, a swiveling and lifting motion is achieved for the multiple joint 14.

Due to the swan neck-like upward curvature of the side arm 13, the space required in the rear area 3 is very small. The side arm 13 can be kept extremely short. Moreover, the main bearing 12 can be disposed in a low position within the body of the vehicle.

The auxiliary frames 11 with the driving organs 31 and the bearings 12 can be inserted as a module in side pockets, which are disposed at the sides of the trunk 6. Owing to the fact that the lower partial joint 16, with respect to the angular position of the guide rods 29, 30, changes little from the perpendicular during the opening process, the side pocket can be limited towards the front, so that little trunk is lost. Owing to the fact that the coupling body 17 is held in the region of the upper edge of the trunk 6 directly below the lid part 4, the guide rods 23, 24 of the partial joint 15, assigned to the lid part 4, can be placed tightly against the lid part, so that little space is lost here also.

For unblocking the opening 8 for the luggage (FIG. 5, FIG. 6), the lock 18b remains in its locked position. The coupling body 17, which is connected with the catch 18, therefore remains stationary. The movement of the lower partial joint 16 therefore is limited. Only the upper quadruple joint 15 can be opened. The joint points 21, 22, which are assigned to the coupling body 17, remain stationary and can only be swiveled. Altogether, it opens only the upper partial joint 15, so that the guide rods 23, 24 are lined up and, with that, only the joint points 19, 20 are shifted. A compressed gas cylinder 34 is provided to support the opening motion. A hydraulic cylinder or a similar supporting organ also comes into consideration. The compressed cylinder 34, is hinged here to the guide rod 24. As a result, when the lid part 4 is closed, the compressed gas cylinder 34 lies tightly against the lid part 4 in an almost horizontal position, so that the volume of the trunk is not limited.

The opening process for unblocking the opening 8 for luggage therefore corresponds to superimposing a swiveling and lifting motion in the case of a conventional quadruple joint.

By means of the invention, a very short side arm 13 is realized, which, because of its low inertia, can easily be moved and can be disposed in a very space-saving manner in side pockets next to the trunk 6.

Due to the forced coupling of the partial joints 15, 16, over the coupling body 17, no further control effort is required to open the lid part 4 to achieve the superimposed lifting and swiveling motion for unblocking the opening 7 for luggage. For swiveling the auxiliary arm 11, the lock 18b can also be unlocked with the help of the hydraulic cylinder 31.

In FIG. 7, a convertible 101 of a second example is shown in a truncated representation. It is also provided with a roof 102, which is constructed as a regionally flexible or totally rigid folding top and can be stowed in the rear region 103 of the vehicle under a lid part 104. Basically, the lid part 104 is identical with or similar to the lid part 4 of the first example and, in fulfilling a double function here, also covers a space 105, which accommodates the folding top and in which the roof 102 is held in the open position, as well as a luggage-holding space 106.

The lid part 104 can also be opened at an acute angle with the driving direction F for unblocking the roof-accommodating opening 107 (FIG. 9, FIG. 10). Moreover, the lid part 4 can also be opened in the opposite direction (FIG. 11, FIG. 12) with inclusion of an obtuse angle with the driving direction F for unblocking an opening 108 for loading and unloading the trunk 106. In its rear end region 109, the lid part 104, as in the first example, is held by a hinge device 110, which ensures that the roof part 104 is held fast in the completely closed state (FIG. 7) as well as when the opening for the roof 102 is open (FIGS. 9, 10).

Aside from the rear hinge 110, the roof part 104 is also held by means of an auxiliary frame 111, the rear region of which is held so that it can be moved over a drag bearing 112 at the body of the vehicle. The auxiliary frame 111 comprises two side arms 113 which are assigned to the sides of the vehicle, extend from the main bearing 112 in the driving direction F and are connected at their end, averted from the drag bearing 112, with a multiple joint 114, the other end of which is connected with the front end region 115 of the lid part 104.

In the examples shown here, the multiple joint 114 is constructed as a quadruple joint. This is not absolutely essential. The quadruple joint comprises two joint points 116, 117, which are assigned to the lid part 104, as well as two joint points 118, 119, which are assigned to the side arms 113 of the auxiliary frame 111.

For connecting the lid part 104 with the auxiliary frame 111, the joint point 116 and 118 are connected by means of a guide rod 120, and the joint points 117 and 119 are connected by means of a guide rod 121.

The joint points 116 and 117 are disposed immovably in each case at the lid part 104. The joint points 118 and 119 on the auxiliary frame side are connected to one another, yet jointly movably with respect to the auxiliary frame 111, over a further guide rod 122, which ensures a constant distance between these joint points. For this purpose, axle stubs, which can be shifted in sliding-block guides 123, 124 of the side arms 113 of the auxiliary frame 111, are assigned to the joint points 118, 119.

In the closed position of the auxiliary frame 111, the sliding-block guides 123, 124 extend in the driving direction F and swivel with the side arms 113 of the auxiliary frame 111 in an upward pointing position during the opening of the lid part 104 for unblocking the opening 107 for the passage of the roof (FIGS. 9, 10).

Furthermore, a lock 125 is provided which holds the lid part 104 in the closed position (FIG. 8) by fixing the joint points 118, 119. By pushing out the piston rod of the hydraulic cylinder 126, which brings about the upward motion of the side arm 113 for unblocking the opening 107 for the passage of the roof 102, the lock 125 is released over a Bowden pull 127, so that a transverse catch 128, which is held by the lock 125, is connected with the guide rods 122 and keeps the joint points 118 and 119, in the closed position, is disengaged and can raise the front end of the lid part 104 by pushing the piston rod further out of the hydraulic cylinder 126.

In the closed position (FIG. 8), the joint points 118, 119, are, in the driving direction F, in the extreme front position in the sliding-block guides 123, 124. While the lid part 104 is being opened to unblock the opening for the passage of the roof 102, the joint points 118, 119 initially are shifted in the sliding-block guides 123, 124 countered to the driving direction F. At the same time, the guide rods 120, 121 are moved from their essentially horizontal position into a position, which is directed upward and at an angle to the side arm 113 of the auxiliary frame 111. As a result, the front end region 115 of the lid part 104 is removed from the side arm 113. As the lid part 104 is opened further in the sense described (FIG. 10), the guide rods 120, 121 change over into an essentially vertical position, so that the distance from the front end of the side arm 113 of the auxiliary frame 111 to the front end 115 of the lid part 104 is maximized. Moreover, the joint points 118,119 are pushed in the sliding-block guides 123, 124 again into the extreme front position, so that the connection between the side arm 113 and the guide rods 120, 121 achieves the maximum possible length. At the same time the hinge points 116, 117 at the lid part 104 are approximately above the main bearing 112 of the auxiliary frame 111. The latter can therefore be shifted very far towards the front, so that the full width of the trunk is available behind this bearing 112 and sufficient trunk space or accessibility to the tail lights remains.

For unblocking the opening 108 for luggage, (FIGS. 11 and 12) the lock 125 remains in its locked position. The transverse catch 128, which is connected with the guide rod 122, therefore remains stationary. Accordingly, the joint points 118 and 119 can also not be moved. Therefore, only a strictly swiveling motion is possible about the joint points, which remain in the extreme front position in the sliding block guides 123 and 124. Here also, the multiple joint 114 is opened up, that is, the guide rods 120 and 121 are lined up. Over all, accordingly a swiveling motion with a superimposed lifting motion is achieved. This corresponds to the usual opening of a multiple joint.

To support the opening motion, a compressed gas cylinder 129 is provided, which is supported at one end at the guide rod 120, and at the other, at a bearing 130 at the lid part 104. A different arrangement of the compressed gas cylinder 129 or a similar supporting organ, such as a hydraulic cylinder, also comes into consideration. For the arrangement shown here, the compressed gas damper 129 is held in the position at rest (FIG. 7, FIG. 8) in the region of the side arms 113. The hinge point 130 at the lid part 104 also lies, in the direction of travel F, in front of the main bearing 112, so that the limitation of the trunk capacity by the compressed gas damper 129 in the closed position of the lid part 104 is minimized.

In a third example (FIG. 17 to FIG. 23), a quadruple joint 114.1 is also provided. It has two joint points 116.1 and 117.1 which are disposed stationary with respect to the lid part 104, and two joint points, 118.1 and 119.1, which are assigned to the auxiliary frame 111.1.

For connecting the lid part 104 with the auxiliary frame 111.1, the joint points 116.1 and 118.1 are connected by means of a guide rod 120.1 and the joints points 117.1 and 119.1 are connected by means of a guide rod 121.1.

The joint points 118.1 and 119.1 on the side of the auxiliary frame are connected to one another over a further guide rod 121.1, which ensures that the distance between these joint points remains constant. However, they can be shifted jointly with respect to the auxiliary frame 111.1. For this purpose, the joint points 118.1 and 119.1 are constructed as axle stubs and remain in a common, curved sliding-block guide 123.1 in the side arm 113.1 of the auxiliary frame 111.1.

In the closed position of the auxiliary frame 111.1, the sliding-block guide 123.1 extends in the driving direction F and follows a course, which curves slightly upward from a rear end to the front. It swivels with the side arms 113.1 when the lid part 114.1 is opened to unblock the opening 107 for the passage of the roof (FIG. 18, FIG. 19) into an upward-pointing position. A lock 125, which locks the lid part 104 in the closed position (FIG. 17), is also provided for the alternative version. After the lock 125 is opened, a transverse catch 128, which is connected with the guiding rod 122.1 and which holds the joint points 118.1 and 119.1 in the closed position, is disengaged and the front end 115 of the lid part can be raised.

In the closed position (FIG. 17) the joint points 118.1 and 119.1 are, in the driving direction F, behind the extreme position in the sliding-block guide 123.1. While the lid part 104 is being opened for unblocking the opening 107 for the passage of the roof 102, the joint points 118.1 and 119.1 are shifted in the common sliding-block guide 123.1 in the direction of travel F. At the same time, the guide rods 120.1 and 121.1 move out of their essentially horizontal position into an angular and upwardly directed position with respect to the side arm 113.1 of the auxiliary frame 111.1. As a result, the front end region 115 of the lid part 104 is removed from the side arm 113.1. As the lid part 104.1 is opened further in the sense given (FIG. 19), the guide rods 120.1 and 121.1 reach an essentially vertical position, as a result of which the distance from the front end of the side arm 113.1 of the auxiliary frame 111.1 to the front end 115 of the lid part 104 is maximized. Moreover, the joint points 118.1, 119.1 are shifted in the sliding-block guide 123.1 in the direction of the extreme front position with respect to the sliding block guide 123.1, so that the connection of side arm 113 and guide rods 120.1 121.1 attains the maximum length possible. The hinge points 116.1 117.1 at the lid part are then approximately above the main bearing 112.1 of the auxiliary frame 111.1. In this embodiment also, this main bearing can be shifted very far to the front. In addition, the main bearing 112.1 and the linkage 130 can be inserted as a whole as a module in a side pocket of the body of the vehicle.

In order to enable the joint points 118.1, 119.1 to be shifted, they are mounted on angular guide rods 131, 132, which are connected at the other end with rollers 133, which can be shifted in the sliding block guide 123.1.

The construction of FIGS. 22 and 23 shows slight geometric modifications of the angular guide rods 131 and 132. In each case, these are stationary with respect to the guide rod 122.1 and, at their ends, averted from the rollers carry the joint points 118.1 and 119.1. In addition, at one of the guide rods 131 or 132, a mourning for a compressed gas damper 129.1 may be provided for supporting the unblocking of the trunk opening 108.

As in the second example, the joint points 118.1 and 119.1 remain stationary here also while the lid part 104 is being opened to unlock the opening 108 for luggage, since the lock 125 is not disengaged for this movement and the rollers in the sliding-block guides 123.1 therefore are not mobile. Only the normal quadruple joint version without shifting of the joint points is then available.

In every case, the hinging 112, 112.1 of the auxiliary frame 111 or 111.1 far towards the front is made possible. As a result, the opening kinematics of the lid part 104 are improved and more generous spatial relationships are formed in the rear region.

The forces for opening the lid part 104 are, moreover, relatively slight, since only a short auxiliary frame 111 or 111.1, the moment of inertia of which is slight, has to be moved. The guide rods 120, 121 or 120.1, 121.1 (open automatically as a result of the shifting of the joint points 118, 119 or 118.1 119.1 relative to the auxiliary frame 111 or 111.1, so that there is no need for additional control mechanisms. The unlocking of the lock 125 also takes place automatically by pushing out the piston rod of the hydraulic cylinder 126. A separate actuation of the lock 125 is therefore not required.

What is claimed is:

1. A convertible (101) with a roof (102), which can be stowed in the rear region (103) of the vehicle beneath a lid part (104), it being possible to open and close the lid part (104), on the one hand, for unblocking an opening (107) for the passage of the roof (102), adjacent to the front end region (115) of the lid part (104) and, on the other, for unblocking an opening (108) for luggage, adjacent to the rear end region (109) of the lid part (104), an auxiliary frame (111; 111.1) being disposed beneath the lid part (104) and connected in the driving direction (F), pre-disposed area over a multiple joint (114; 114.1) with the lid part (104) and mounted moveably with respect to the vehicle body in its rear region (112; 112.1), wherein the multiple joint (114; 114.1), during the unblocking of the opening (107) for the passage of the roof (102), is held in an opened position, which increases the distance between the lid part (104) and the auxiliary frame (111; 111.1) in comparison to the distance in the closed position, wherein at least one elongated hole, functioning as a sliding block guide (123; 124; 123.1) is constructed for shifting the joint point or points (118, 119, 118.1, 119.1) assigned to the auxiliary frame (111, 111.1).

2. The convertible of claim 1, wherein the multiple joint (114; 114.1) is a quadruple joint, two joint points (116, 117; 116.1, 117.1) being assigned to the lid part (104) and two further joint points (118, 119; 118.1, 119.1) being assigned to the auxiliary frame (111; 111.1).

3. A convertible (101) with a roof (102), which can be stowed in the rear region (103) of the vehicle beneath a lid part (104), it being possible to open and close the lid part (104), on the one hand, for unblocking an opening (107) for the passage of the roof (102), adjacent to the front end region (115) of the lid part (104) and, on the other, for unblocking an opening (108) for luggage, adjacent to the rear end region (109) of the lid part (104), an auxiliary frame (111; 111.1) being disposed beneath the lid part (104) and connected, in the driving direction (F), pre-disposed area over a multiple joint (114; 114.1) with the lid part (104) and mounted moveably with respect to the vehicle body in its rear region (112; 112.1), wherein the multiple joint (114; 114.1), during the unblocking of the opening (107) for the passage of the roof (102), is held in an opened position, which increases the distance between the lid part (104) and the auxiliary frame (111; 111.1) in comparison to the distance in the closed position, wherein two joint points (118, 119) in the auxiliary frame (111) are held in two elongated holes (123; 124), which extend essentially linearly and, in the closed position, in the driving direction.

4. The convertible of claim 3, wherein the multiple joint (114; 114.1) is a quadruple joint, two joint points (116, 117; 116.1, 117.1) being assigned to the lid part (104) and two further joint points (118, 119; 118.1, 119.1) being assigned to the auxiliary frame (111; 111.1).

5. A convertible (101) with a roof (102), which can be stowed in the rear region (103) of the vehicle beneath a lid part (104), it being possible to open and close the lid part (104), on the one hand, for unblocking an opening (107) for the passage of the roof (102), adjacent to the front end region (115) of the lid part (104) and, on the other, for unblocking an opening (108) for luggage, adjacent to the rear end region (109) of the lid part (104), an auxiliary frame (111; 111.1) being disposed beneath the lid part (104) and connected in the driving direction (F), pre-disposed area over a multiple joint (114; 114.1) with the lid part (104) and mounted moveably with respect to the vehicle body in its rear region (112; 112.1), wherein the multiple joint (114; 114.1), during the unblocking of the opening (107) for the passage of the roof (102), is held in an opened position, which increases the distance between the lid part (104) and the auxiliary frame (111; 111.1) in comparison to the distance in the closed position, wherein two joint points (118, 119) in the auxiliary frame (111) are held in two elongated holes (123; 124), which extend essentially linearly and, in the closed position, in the driving direction, and wherein, in the closed position of the lid part (104), the joint points (118, 119) are held in elongated holes (123; 124) in an extreme front position and, during the opening process of the lid part (104), for unblocking the opening (107) for the passage of the roof, initially can be shifted in a rearward direction and, as the opening process is continued, can be shifted once again in the direction of the extreme front region.

6. The convertible of claim 5, wherein the multiple joint (114; 114.1) is a quadruple joint, two joint points (116, 117; 116.1, 117.1) being assigned to the lid part (104) and two further joint points (118, 119; 118.1, 119.1) being assigned to the auxiliary frame (111; 111.1).

7. A convertible (101) with a roof (102), which can be stowed in the rear region (103) of the vehicle beneath a lid part (104), it being possible to open and close the lid part (104), on the one hand, for unblocking an opening (107) for the passage of the roof (102), adjacent to the front end region (115) of the lid part (104) and, on the other, for unblocking an opening (108) for luggage, adjacent to the rear end region (109) of the lid part (104), an auxiliary frame (111; 111.1) being disposed beneath the lid part (104) and connected in the driving direction (F), pre-disposed area over a multiple joint (114; 114.1) with the lid part (104) and mounted moveably with respect to the vehicle body in its rear region (112; 112.1), wherein the multiple joint (114; 114.1), during the unblocking of the opening (107) for the passage of the roof (102), is held in an opened position, which increases the distance between the lid part (104) and the auxiliary frame (111; 111.1) in comparison to the distance in the closed position, wherein the joint (114.1) is a quadruple joint and two of the joint points (118.1; 119.1) are assigned to the lid part (104) and two further ones to the auxiliary frame (111.1), the joint points (118.1; 119.1), assigned to the auxiliary frame (111.1), being moveable in a common sliding-block guide (123.1).

8. A convertible (101) with a roof (102), which can be stowed in the rear region (103) of the vehicle beneath a lid part (104), it being possible to open and close the lid part (104), on the one hand, for unblocking an opening (107) for the passage of the roof (102), adjacent to the front end region (115) of the lid part (104) and, on the other, for unblocking an opening (108) for luggage, adjacent to the rear end region (109) of the lid part (104), an auxiliary frame (111; 111.1) being disposed beneath the lid part (104) and connected, in the driving direction (F), pre-disposed area over a multiple joint (114; 114.1) with the lid part (104) and mounted moveably with respect to the vehicle body in its rear region (112; 112.1), wherein the multiple joint (114; 114.1), during the unblocking of the opening (107) for the passage of the roof (102), is held in an opened position, which increases the distance between the lid part (104) and the auxiliary frame (111; 111.1) in comparison to the distance in the closed position, wherein the joint (114.1) is a quadruple joint and two of the joint points (118.1; 119.1) are assigned to the lid part (104) and two further ones to the auxiliary frame (111.1), the joint points (118.1; 119.1), assigned to the auxiliary frame (111.1), being moveable in a common sliding-block guide (123.1), and wherein the sliding-block guide (123.1) is curved upward.

* * * * *